(12) United States Patent
Ahmed

(10) Patent No.: US 12,185,293 B2
(45) Date of Patent: Dec. 31, 2024

(54) NETWORK NODE AND METHOD FOR SELECTING AN ALLOCATION STRATEGY IN SPECTRUM SHARING

(71) Applicant: Telefonaktiebolaget LM Ericsson (publ), Stockholm (SE)

(72) Inventor: Saad Naveed Ahmed, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 17/795,936

(22) PCT Filed: Apr. 8, 2020

(86) PCT No.: PCT/SE2020/050366
§ 371 (c)(1),
(2) Date: Jul. 28, 2022

(87) PCT Pub. No.: WO2021/154133
PCT Pub. Date: Aug. 5, 2021

(65) Prior Publication Data
US 2023/0070270 A1    Mar. 9, 2023

Related U.S. Application Data

(60) Provisional application No. 62/967,696, filed on Jan. 30, 2020.

(51) Int. Cl.
*H04W 72/0453*   (2023.01)
*H04L 5/00*   (2006.01)
*H04W 16/14*   (2009.01)

(52) U.S. Cl.
CPC ....... *H04W 72/0453* (2013.01); *H04L 5/0094* (2013.01); *H04W 16/14* (2013.01)

(58) Field of Classification Search
CPC . H04W 72/0453; H04W 16/14; H04W 28/16; H04L 5/0094; H04L 5/003;
(Continued)

(56) References Cited

U.S. PATENT DOCUMENTS

2013/0210447 A1   8/2013   Moe et al.
2016/0262154 A1   9/2016   Alsohaily et al.
(Continued)

FOREIGN PATENT DOCUMENTS

CN   104159234 B   9/2017
EP   2203011 A1   6/2010
(Continued)

OTHER PUBLICATIONS

Author Unknown, "Technical Specification Group Radio Access Network; Evolved Universal Terrestrial Radio Access (E-UTRA); Physical layer procedures (Release 16)," Technical Specification 36.213, Version 16.0.0, Dec. 2019, 3GPP Organizational Partners, 569 pages.
(Continued)

*Primary Examiner* — Kyaw Z Soe
(74) *Attorney, Agent, or Firm* — Withrow & Terranova, PLLC

(57) ABSTRACT

An allocation strategy allocating Resource Block Groups (RBGs) on a frequency carrier to a first Radio Access technology (RAT) and a second RAT for radio communication with a User Equipment (UE), is provided. A first allocation strategy is evaluated by allocating with start from the decided first RAT starting point, a first number of RBGs to the first RAT. The second RAT is allocated a second number of RBGs by use of the RBs that remains on the carrier after occupation of the first number of RBGs. A first difference is computed between the number of RBs requested for the first RAT and a first number of RBs
(Continued)

comprised in the first number of RBGs allocated to the first RAT, and further computes a second difference between the number of RBs requested for the second RAT and a second number of RBs as comprised in the second number of RBGs.

19 Claims, 19 Drawing Sheets

(58) Field of Classification Search
CPC ... H04L 5/0044; H04L 5/0053; H04L 5/0058; H04L 5/0078
See application file for complete search history.

(56) References Cited

U.S. PATENT DOCUMENTS

| | | |
|---|---|---|
| 2018/0070339 A1 | 3/2018 | Horiuchi et al. |
| 2019/0149365 A1* | 5/2019 | Chatterjee ........... H04L 25/0226 370/329 |
| 2019/0208530 A1 | 7/2019 | Gao et al. |
| 2021/0337577 A1* | 10/2021 | Sun .................... H04W 72/1273 |
| 2023/0216632 A1* | 7/2023 | Go ........................ H04L 5/0094 370/329 |
| 2023/0224880 A1* | 7/2023 | Xiong ............... H04W 72/0453 370/329 |

FOREIGN PATENT DOCUMENTS

| | | |
|---|---|---|
| EP | 3229514 A1 | 10/2017 |
| WO | 2012072119 A1 | 6/2012 |
| WO | 2012163220 A1 | 12/2012 |
| WO | 2018128426 A1 | 7/2018 |

OTHER PUBLICATIONS

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.

International Search Report and Written Opinion for International Patent Application No. PCT/SE2020/050366, mailed Dec. 10, 2020, 12 pages.

Extended European Search Report for European Patent Application No. 20916651.1, mailed Jun. 6, 2023, 9 pages.

* cited by examiner

Fig. 6A
10MHz

| | | | | | |
|---|---|---|---|---|---|
| Unused | 2 | 1 | | 2 | 1 |
| | | | Needed LTE | 37,5 | |
| | | | Needed NR | 13 | |
| | Col. 1 | Col. 2 | | Col. 3 | Col. 4 |
| Allocated LTE | 38/50 | 35/50 | | 39/50 | 36/50 |
| Allocated NR | 12/52 | 16/52 | | 11/52 | 15/52 |
| Delta LTE | 0,5 | -2,5 | | 1,5 | -1,5 |
| Delta NR | -1 | 3 | | -2 | 2 |
| Selection Index | 1,25 | 15,25 | | 6,25 | 6,25 |

Fig. 6B

| | | | | | |
|---|---|---|---|---|---|
| Unused | 2 | 1 | | 1 | 1 |
| | | | Needed LTE | 25 | |
| | | | Needed NR | 26 | |
| | Col. 1 | Col. 2 | | Col. 3 | Col. 4 |
| Allocated LTE | 26/50 | 23/50 | | 27/50 | 24/50 |
| Allocated NR | 24/52 | 28/52 | | 23/52 | 27/52 |
| Delta LTE | 1 | -2 | | 2 | -1 |
| Delta NR | -2 | 2 | | -3 | 1 |
| Selection Index | 5 | 8 | | 13 | 2 |

Fig. 7B

| | | | | | |
|---|---|---|---|---|---|
| Unused | | 2 | 1 | 2 | 1 |
| | | | Needed LTE | 12,5 | |
| | | | Needed NR | 39 | |
| Allocated LTE | Col. 1 | Col. 2 | | Col. 3 | Col. 4 |
| Allocated NR | 14/50 | 11/50 | | 15/50 | 12/50 |
| Delta LTE | 36/52 | 40/52 | | 35/52 | 39/52 |
| Delta NR | 1,5 | -1,5 | | 2,5 | -0,5 |
| Selection Index | -3 | 1 | | -4 | 0 |
| | 11,25 | 3,25 | | 22,25 | 0,25 |

| Unused | 4 | 4 | | | 4 | 4 |
|---|---|---|---|---|---|---|
| | | | Needed LTE | 56,25 | | |
| | | | Needed NR | 19,75 | | |
| | Col. 1 | Col. 2 | | | Col. 3 | Col. 4 |
| Allocated LTE | 59/75 | 51/75 | | | 60/75 | 52/75 |
| Allocated NR | 16/79 | 24/79 | | | 15/79 | 23/79 |
| Delta LTE | 2,75 | -5,25 | | | -1,5 | -4,25 |
| Delta NR | -3,75 | 4,25 | | | 2 | 3,25 |

Fig. 9B

| Unused | 4 | 4 | | | 8 | 4 |
|---|---|---|---|---|---|---|
| | | | Needed LTE | 37,5 | | |
| | | | Needed NR | 39,5 | | |
| | Col. 1 | Col. 2 | | | Col. 3 | Col. 4 |
| Allocated LTE | 43/75 | 35/75 | | | 40/75 | 36/75 |
| Allocated NR | 32/79 | 40/79 | | | 31/79 | 39/79 |
| Delta LTE | 5,5 | -2,5 | | | 2,5 | -1,5 |
| Delta NR | -7,5 | 0,5 | | | -8,5 | -0,5 |

Fig. 10B

| Unused | 4 | 4 | | | 4 | 4 |
|---|---|---|---|---|---|---|
| | | | Needed LTE | 18,75 | | |
| | | | Needed NR | 59,25 | | |
| | Col. 1 | Col. 2 | | | Col. 3 | Col. 4 |
| Allocated LTE | 19/75 | 11/75 | | | 20/75 | 12/75 |
| Allocated NR | 56/79 | 64/79 | | | 55/79 | 63/79 |
| Delta LTE | 0,25 | -7,75 | | | 1,25 | -6,75 |
| Delta NR | -3,25 | 4,75 | | | -4,25 | 3,75 |

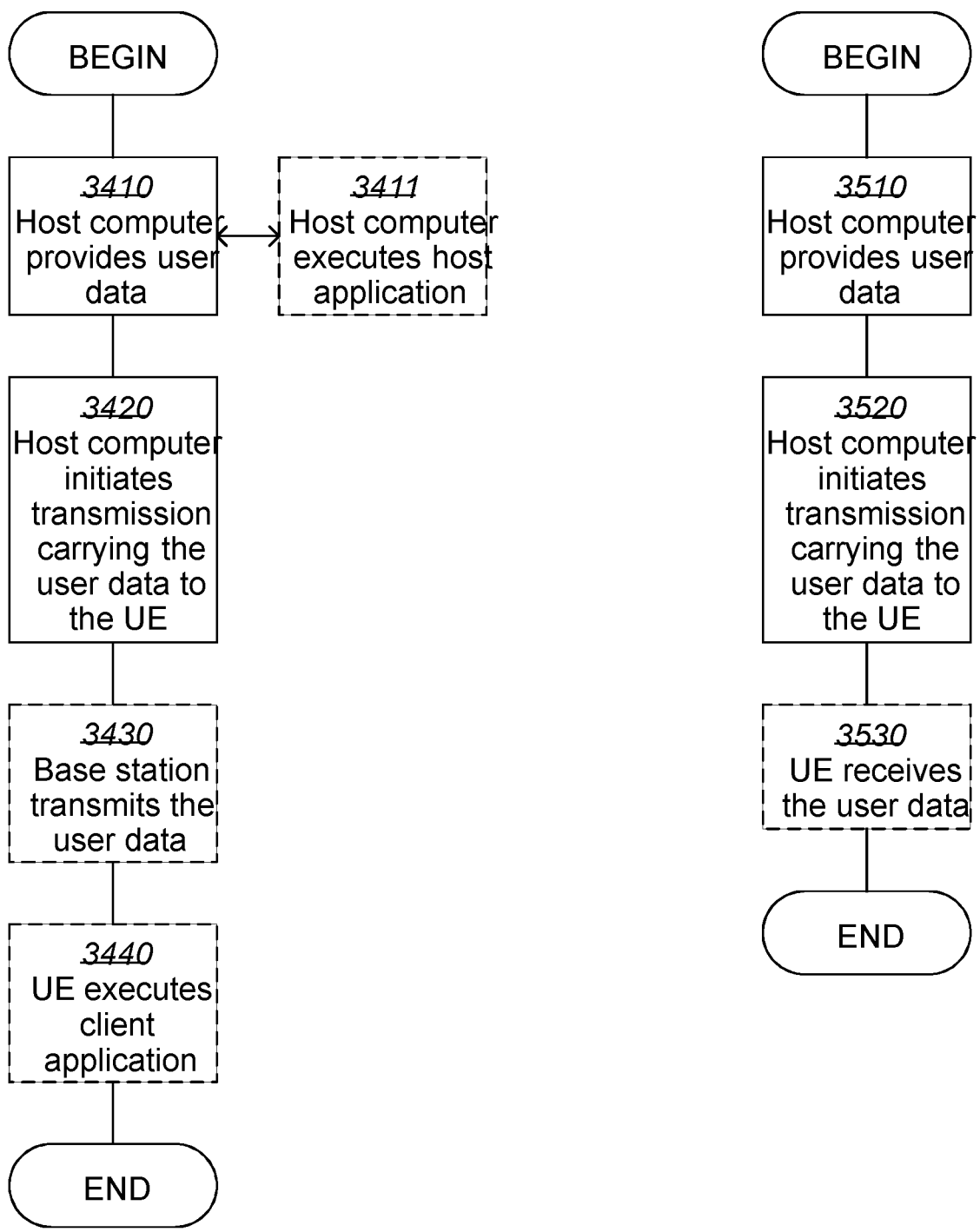

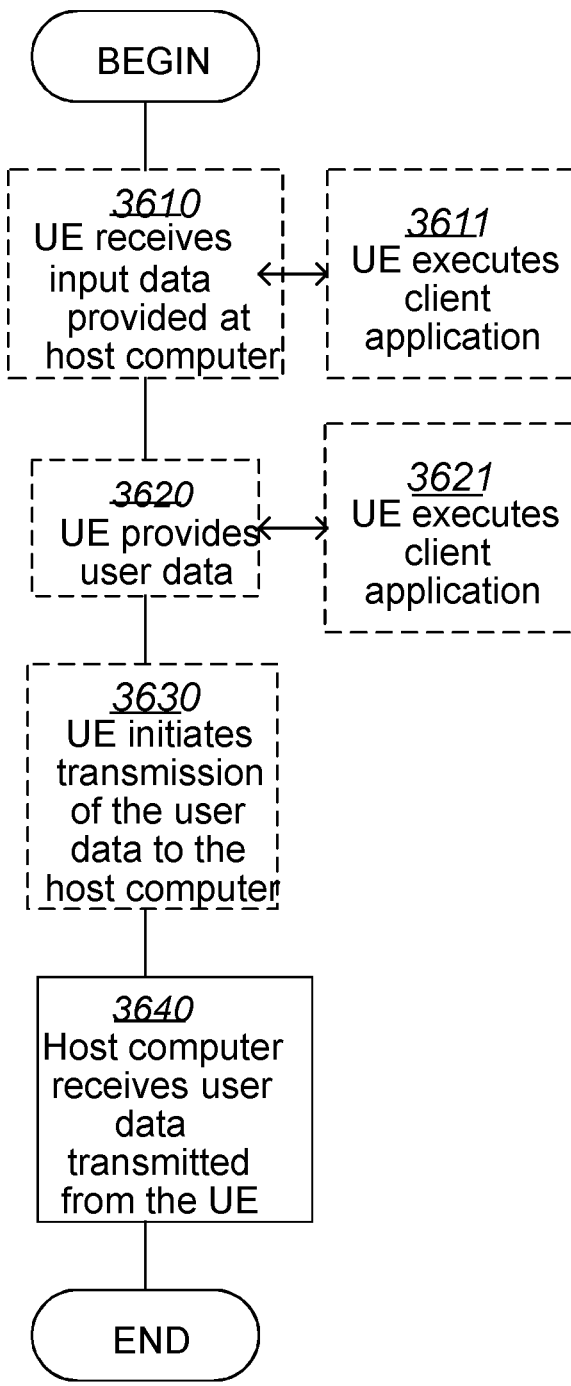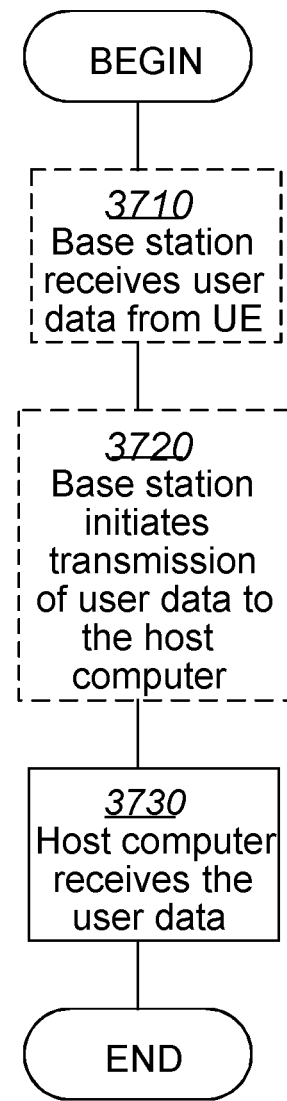
FIG 18
FIG 19

NETWORK NODE AND METHOD FOR SELECTING AN ALLOCATION STRATEGY IN SPECTRUM SHARING

This application is a 35 U.S.C. § 371 national phase filing of International Application No. PCT/SE2020/050366, filed Apr. 8, 2020, which claims the benefit of provisional patent application Ser. No. 62/967,696, filed Jan. 30, 2020, the disclosures of which are incorporated herein by reference in their entireties.

TECHNICAL FIELD

The present disclosure relates to methods and network nodes of resource allocation in spectrum sharing Radio Access Technology. It further relates to computer programs and carriers corresponding to the above methods and network nodes.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Spectrum Sharing:

5G will be introduced on both new and legacy spectrum bands. This requires functionality that enables operators to plan its evolution of network assets including both spectrum bands and technologies, as well as, allow for a seamless roll-out of 5G with optimal end-user performance. A Spectrum Sharing may give the possibility to intelligently, flexibly and quickly introduce and add 5G within existing 4G carriers, e.g. introduce 5G on low/mid bands for wide area coverage and outside in coverage. The Spectrum Sharing software may dynamically share spectrum between 4G and 5G carriers based on traffic demand. The switch between carriers happens within milliseconds, which minimizes spectrum wastage and allows for best end-user performance. FIG. 1 depicts LTE and NR sharing a spectrum in time and frequency, wherein the LTE part of the carriers is represented by white staples in the bottom of the figure, and the NR part of the carriers is represented by black staples in the top of the figure.

Resource Allocation Type

Resource Allocation Type specifies the way in which the scheduler may allocate resource blocks for each transmission.

Reference to: 3GPP TS 36.213 7.1.6 Resource allocation, resource allocation type specifies the way in which the scheduler allocate resource blocks (RB) for each transmission. Just in terms of flexibility, the way to give the maximum flexibility of resource block allocation would be to use a string of a bit map (bit stream), each bit of which represent each resource block. In this the maximum flexibility may be achieved, but it would create too much complication of resource allocation process or too much data (too long bit map) to allocate the resources.

Resource Allocation Type 0 is the simplest way of allocation resources. First it divides resource blocks into multiples of groups. These Resource Block Groups are referred to as (RBGs). The number of resource block in each group varies depending on the system band width. It means RBG size gets different depending on the system bandwidth.

Resource allocation type 0 allocates the resources using a bitmap and each bit represents one RBG. RBG is a unit comprised of multiple RBs. The number of RBs within one RBG depends on the system bandwidth.

SUMMARY

An object of embodiments herein is to improve the performance in a multi Radio Access Technology (RAT) communications system.

According to an aspect, the object is achieved by a method performed by a network node for selecting an allocation strategy for allocating Resource Block Groups, RBGs, on a frequency carrier to respectively a first Radio Access technology, RAT, and to a second RAT for radio communication with a User Equipment, UE. A resource allocation type 0 is used for allocation of Resource Block Groups, RBGs, to both the first RAT and to the second RAT. Eeach RBG comprises one or more RBs.

The network node decides that a starting point on the carrier for allocating the RBGs when evaluating a first allocation strategy is for the first RAT, to be followed by the second RAT when evaluating a second allocation strategy.

The network node evaluates a first allocation strategy by allocating with start from the decided first RAT starting point, a first number of RBGs to the first RAT. The first number of RBGs is based on a number of RBs requested for the first RAT, then the network node allocates to the second RAT, a second number of RBGs by use of the RBs that remains on the carrier after occupation of the first number of RBGs. The second number should be no more than to meet a number of RBs requested for the second RAT. The network node computes a first difference between the number of RBs requested for the first RAT and a first number of RBs comprised in the first number of RBGs allocated to the first RAT, and further computes a second difference between the number of RBs requested for the second RAT and a second number of RBs as comprised in the second number of RBGs.

The network node then evaluates a second allocation strategy, by allocating to the decided second RAT, with start from the edge of the frequency carrier opposing that the starting point, a second number of RBGs to the second RAT. The second number of RBGs is based on a number of RBs requested for the second RAT. Then the network node allocates to the first RAT, a first number of RBGs by use of the RBs that remains on the frequency carrier after occupation by the second number of RBGs. The first number of RBGs should be no more than to meet a requested number of RBs for the first RAT. The network node computes a first difference between the number of RBs requested for the second RAT and the second number of RBs as comprised in the second number of RBGs, and further computes a second difference between the number of RBs requested for the first RAT and a first number of RBs as comprised in the first number of RBGs.

With the starting point being for the first RAT, the network node selects an allocation strategy out of the first allocation strategy and second allocation strategy based on the first difference and the second difference of the evaluated first strategy, and the first difference and second difference of the evaluated second strategy.

According to an aspect, the object is achieved by a network node configured to select an allocation strategy for allocating Resource Block Groups, RBGs, on a frequency carrier to respectively a first Radio Access technology, RAT, and a second RAT for radio communication with a User Equipment, UE. A resource allocation type 0 is adapted to be used for allocation of Resource Block Groups, RBGs, to both the first RAT and to the second RAT, wherein each RBG is adapted to comprise one or more RBs, wherein the network node further is configured to:

decide that a starting point on the carrier for allocating the RBGs when evaluating a first allocation strategy is for the first RAT, to be followed by the second RAT when evaluating a second allocation strategy, evaluate a first allocation strategy by allocate with start from the decided first RAT starting point, a first number of RBGs to the first RAT, wherein the first number of RBGs is adapted to be based on a number of RBs requested for the first RAT, then allocate to the second RAT a second number of RBGs by use of the RBs that remains on the carrier after occupation of the first number of RBGs, whereas the second number should be no more than to meet a number of RBs requested for the second RAT, and compute a first difference between the number of RBs requested for the first RAT and a first number of RBs comprised in the first number of RBGs allocated to the first RAT, and compute a second difference between the number of RBs requested for the second RAT and a second number of RBs as comprised in the second number of RBGs, then evaluate a second allocation strategy, by allocate to the decided second RAT, with start from the edge of the frequency carrier opposing that the starting point, a second number of RBGs to the second RAT, wherein the second number of RBGs is adapted to be based on a number of RBs requested for the second RAT, then allocate to the first RAT, a first number of RBGs by use of the RBs that remains on the frequency carrier after occupation by the second number of RBGs, whereas the first number of RBGs should be no more than to meet a requested number of RBs for the first RAT, and compute a first difference between the number of RBs requested for the second RAT and the second number of RBs as comprised in the second number of RBGs, and compute a second difference between the number of RBs requested for the first RAT and a first number of RBs as comprised in the first number of RBGs, and with the starting point being for the first RAT, select an allocation strategy out of the first allocation strategy and second allocation strategy based on the first difference and the second difference of the evaluated first strategy, and the first difference and second difference of the evaluated second strategy.

Advantages of embodiments herein at least comprises that resource division is performed such that over or under utilization of RBs is minimum, and that the resource allocation type 0 can be reused in the system. This results in an improved performance in a multi RAT communications system.

BRIEF DESCRIPTION OF THE DRAWINGS

FIGS. 6A, 6B, 7A, 7B, 8A, 8B, 9A, 9B, 10A, 10B, 11A, and 11B depict examples of Physical Downlink Shared Channel RBG impact.

FIGS. 16 to 19 are flowcharts illustrating methods implemented in a communication system including a host computer, a base station and a user equipment.

DETAILED DESCRIPTION

Figure 1:
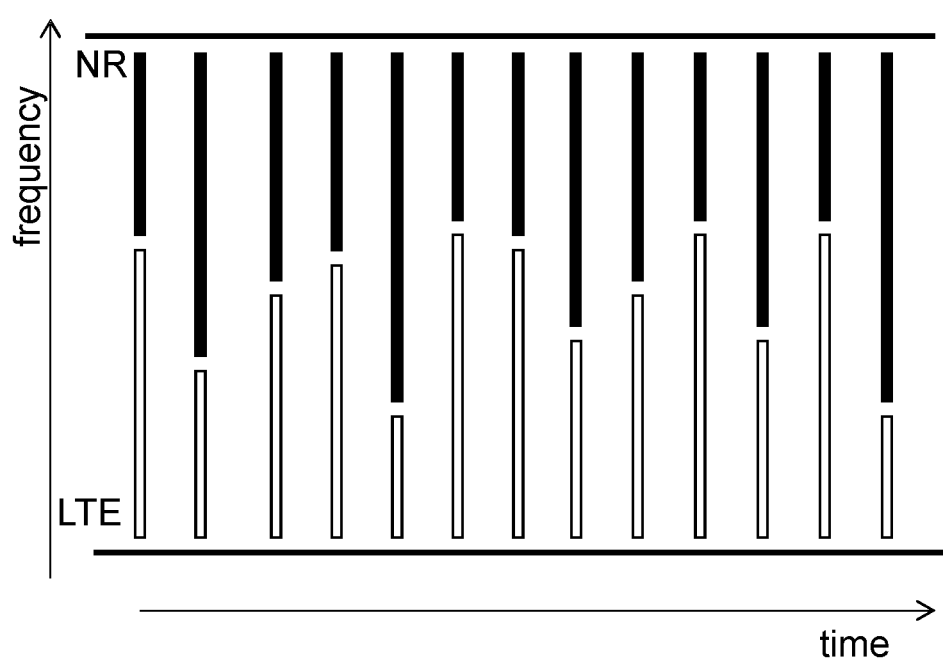
FIG. 1 Shows an example of LTE and NR sharing spectrum.

As a part of developing embodiments herein the inventors identified a problem which first will be discussed.

The resource allocation type 0 uses a bit map to address RBGs, within a grid of Resource Blocks (RB). There will be two bitmaps, one for NR, one for LTE. The edge most RB for NR will be different than LTE. The bitmap is with respect to a starting point, i.e. which RAT of LTE and NR to start allocation, corresponding to an edge most RB of the RB grid of the frequency carrier of that RAT. The resource allocation type 0 provides quicker processing and lesser memory consumption at the expense of lesser allocation flexibility. The resource allocation type 0 provides quicker processing and lesser memory consumption at the expense of lesser allocation flexibility. This inflexibility becomes more serious when spectrum must be shared between LTE and NR. This is because for the same Subcarrier Spacing (SCS), the number of RBs and RBG size may differ between NR and LTE, when sharing the same frequency carrier. This applies despite that the carrier is referred to as having a fixed spectrum bandwidth.

In current LTE and NR standards the size of the RBs in time-frequency are same. between LTE and NR when subcarrier spacing is 15 KHz. This may however be changed in future standard. The technology provided herein may be applied irrespective of the size of the RBs being the same for the first RAT e.g. NR or by the second RAT, e.g. LTE, while it is from here assumed that the RBs are the same size. The number of RBs on the available for use on the frequency carrier may differ between the first and second RAT. An RB allocated at the edge of the frequency carrier for the first RAT may be at another distance from the centre of the frequency carrier that edge most RB allocated to the second RAT.

Resource Allocation Type 0 allocates RBs in quantification numbers of Resource Block Groups, RBGs, each comprising two or more RBS, while an edge most BRG may consist of just one RB. RBG size may be different for the first RAT and the second RAT, and differs also between different predefined bandwidths as is shown in the table below.

3GPP defines NR RBG size in 38.214—Table 5.1.2.2.1-1: Nominal RBG size P,

TABLE 6.1.2.2.1-1

Nominal RBG size P Bandwidth Part Size.

| | Bandwidth (15 KHz SCS) | | | |
|---|---|---|---|---|
| | 5 MHz | 10 MHz | 15 MHz | 20 MHz |
| LTE (no. of RBs) | 25 | 50 | 75 | 100 |
| NR (no. of RBs) | 25 | 52 | 79 | 106 |
| LTE (RBG size/last) | 2/1 | 3/2 | 4/3 | 4/4 |
| NR(RBG size/last) | 2/1 | 4/4 | 8/7 | 16/10 |

The start point on the frequency carrier serving as a reference for the RBG allocation type 0 differs between LTE and NR when the number of RBs for use differ between the two technologies for a given channel bandwidth. This leads to problems when the two technologies share the same frequency carrier When both NR and LTE are allocated RBs on the same frequency carrier by resource allocation type 0 this may lead to unutilized RBs, lowering user and cell throughputs. An obvious solution to eliminate this wastage is to use a resource allocation type other than 0.

Another way to minimize wastage with Resource allocation type 0, is to over allocate one RAT at the expense of other. This will utilize the RBs but will create inefficiencies as unneeded resources will be given to one RAT and the other RAT will get lesser resources than required.

An object of embodiments herein is to improve the performance in a multi RAT communications system, in terms of efficiently using the RBs on the frequency carrier and ensure that the both NR and LTE are given shares of the common resource that is fair with respect to the need of the respective RAT.

Embodiments herein e.g. relate to Methods of Resource Allocation in Spectrum Sharing RATs. Embodiments here provide reduced resource inefficiencies due to Resource Allocation Type 0 in spectrum sharing RATs.

Embodiments herein provide a method to minimize the above-mentioned problems with Resource allocation type 0 in a multi RAT system of shared spectrum. The method finds RBG allocation between LTE and NR that minimizes the allocation inefficiency by minimizing the over and under allocation to each.

Advantage of embodiments herein at least comprises:
Resource division is performed such that over or under utilization of RBs is minimum.
Resource allocation type 0 can be reused in the system.

Figure 2:
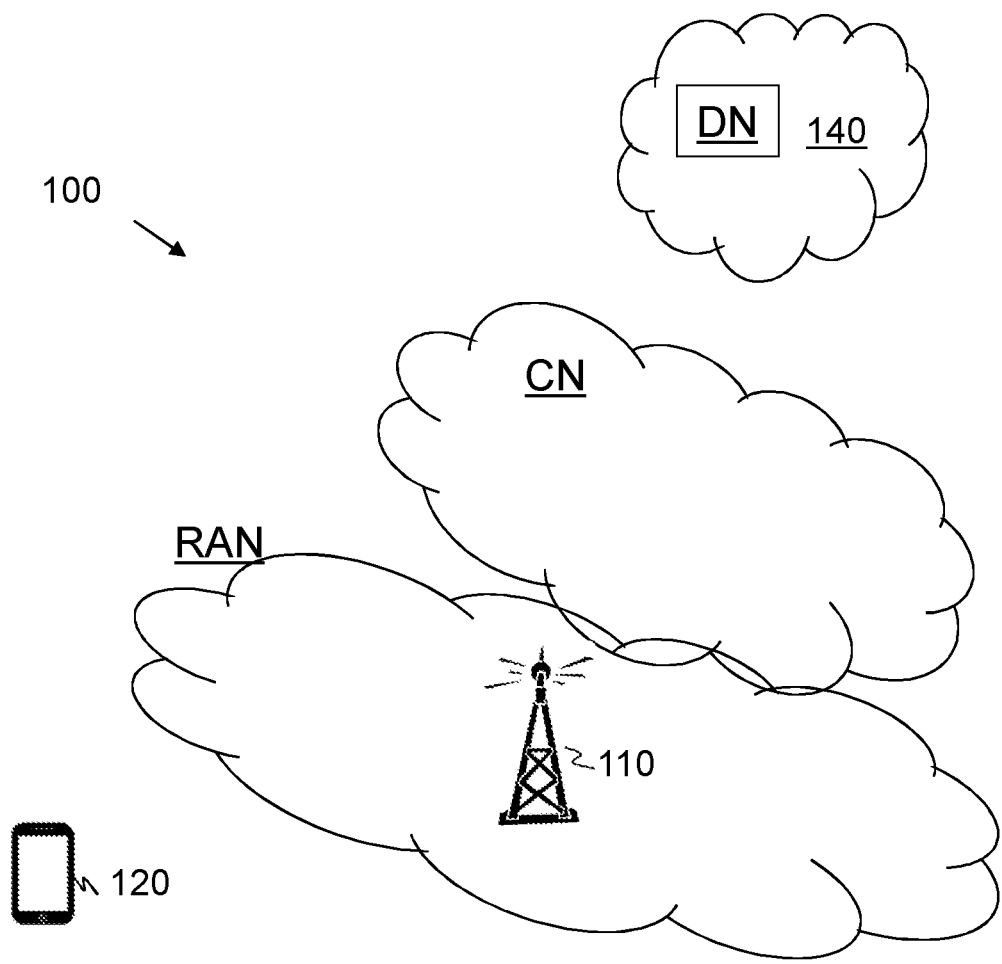
FIG. 2 is a schematic overview depicting a wireless communication network.

FIG. 2 is a schematic overview depicting a wireless communications network 100 wherein embodiments herein may be implemented. The wireless communications network 100 comprises one or more RANs and one or more CNs. The wireless communications network 100 may use 5G NR but may further use a number of other different Radio Access Technologies (RAT)s, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. According to embodiments herein, a first RAT may e.g. be any one out of LTE or NR. A second RAT may e.g. be LTE if the first RAT is NR or NR if the first RAT is LTE.

Network nodes such as a network node 110, also referred to as the network node 110, operates in the wireless communications network 100, providing radio coverage by means of antenna beams, referred to as beams herein. The network node 110 provides a number of beams, and may use these beams for communicating with e.g. a UE 120. The network node 110 provides radio coverage over a geographical area by means of antenna beams. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a standalone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by network node 110 depending e.g. on the radio access technology and terminology used.

User Equipments operate in the wireless communications network 100, such as a UE 120. The UE 120 may provide radio coverage by means of a number of antenna beams 127, also referred to as beams herein. The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may be performed by the network node 110. As an alternative, a Distributed Node (DN) and functionality, e.g. comprised in a cloud 140 as shown in FIG. 3, may be used for performing or partly performing the methods.

Figure 3:
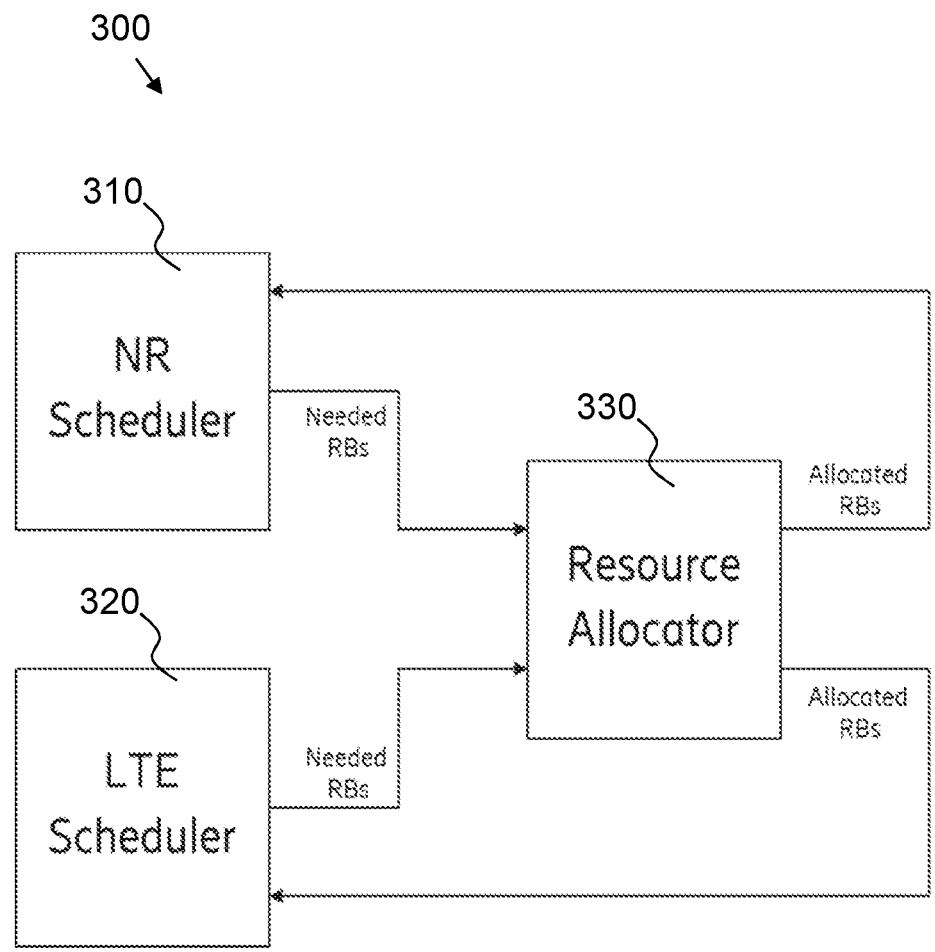
FIG. 3 depicts a scheduler.

FIG. 3 depicts a scheduler 300, e.g. in the network node 110, where embodiments herein may be implemented. The scheduler 300 comprises an NR scheduler 310 and an LTE scheduler 320. The scheduler 300 further comprises a resource allocator 330 for allocating resource blocks for each transmission according to embodiments herein.

Figure 4:
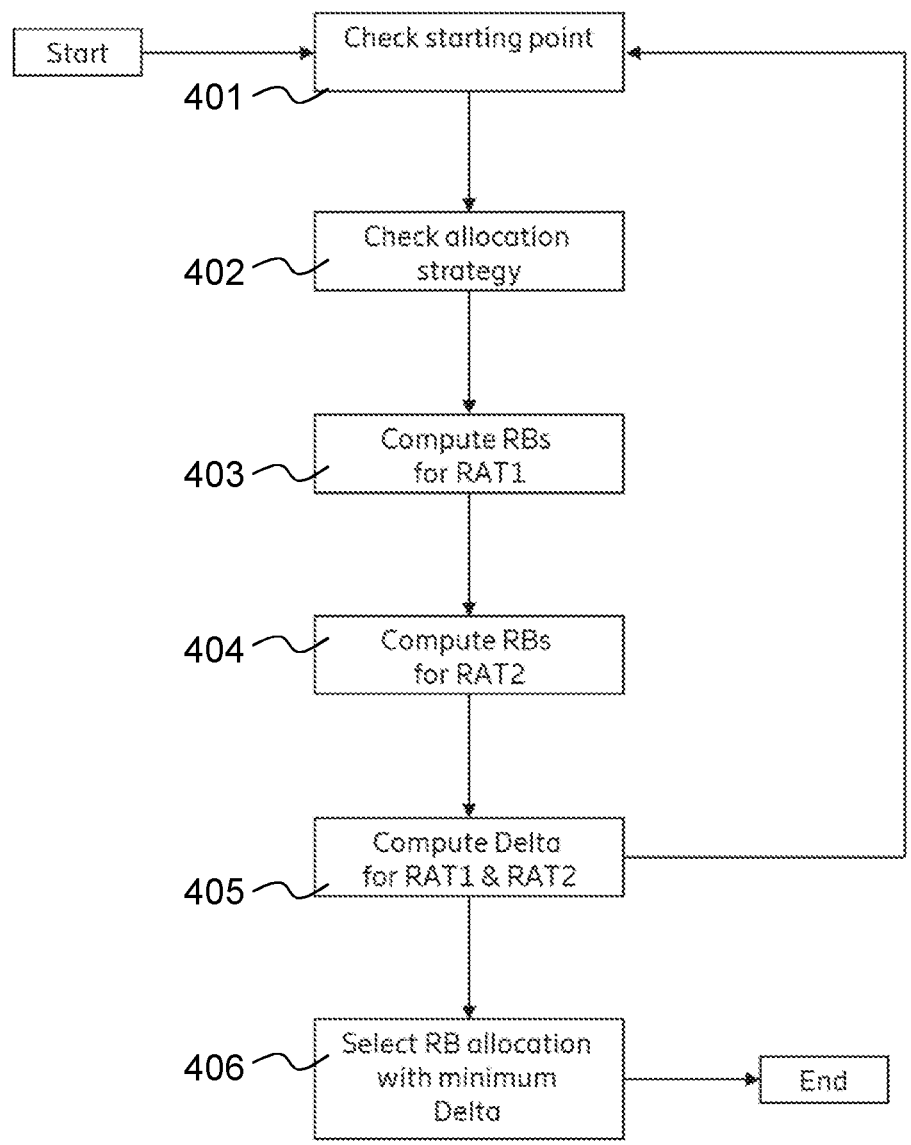
FIGS. 4, 5a and 5b depicts flow diagrams according to example methods herein.

FIG. 4 depicts a Flow diagram according to an example method herein.

Two or more allocation strategies are to be evaluated in embodiments herein. In some embodiments a first allocation strategy and a second first allocation strategy are to be evaluated. Then the most suitable of those shall be selected. The network node 110 checks 401 whether a starting point for the method shall be that of a first RAT or of a second RAT. E.g., the network node 110 decides that the starting point on the carrier for allocating the RBGs when evaluating a first allocation strategy is for the first RAT, to be followed by the second RAT when evaluating a second allocation strategy.

E.g., the network node 110 decides that a starting point on the carrier for allocating the RBs is for a first RAT. The first RAT may e.g. be any one out of LTE or NR. The second RAT may e.g. be LTE if first RAT is NR or NR if first RAT is LTE.

The network node 110 checks 402 whether an allocation strategy should be a first allocation strategy or a second allocation strategy. The network node 110 computes 403 RBs for the first RAT and further computes 404 RBs for the second RAT. The network node 110 then computes 405 delta for the first RAT and for the second RAT, i.e. the difference for the first RAT and the difference for the second RAT.

The network node 110 selects 406 which RB allocation to use e.g. the RB allocation with the minimum delta. An advantage is that the method may then be repeated but with starting point at the second RAT to find further allocations to select among.

Figure 5A:
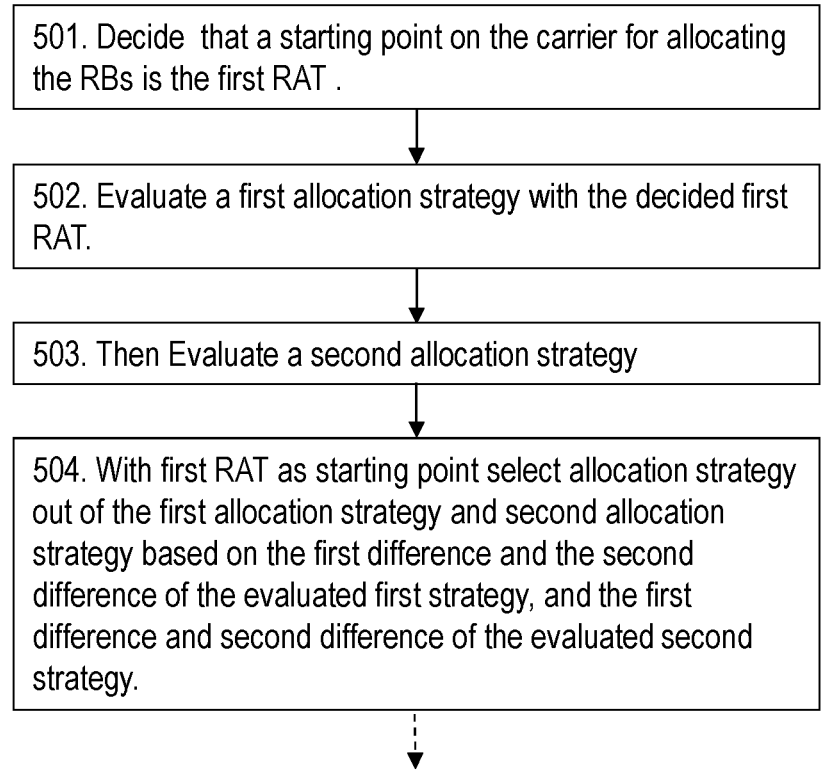
Figure 5B:
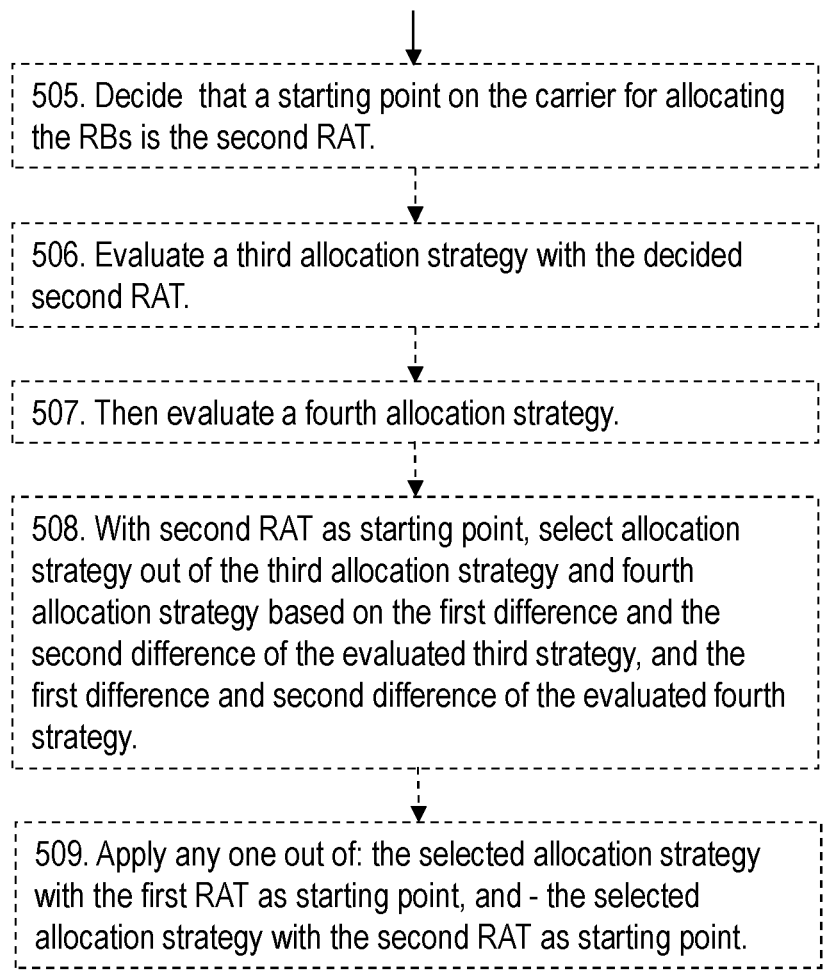

FIG. 5a shows actions 501-504 and Figure 5b shows optional.actions 505-509 of an example method performed by the network node 110 for selecting an allocation strategy for allocating RBGs on a frequency carrier to respectively a first RAT and to a second RAT for radio communication with the UE. 120. A resource allocation type 0 is used for allocation of RBGs to both the first RAT and to the second RAT, wherein each RBG comprises one or more RBs.

The resource allocation type 0 may indicate an allocated RBG with respect to a grid of RBs having a start point RB, and where there is a difference between the first and second RAT in respect of at least one of: A distance from the centre of the frequency carrier to the start point RB; the number of RBs comprised in the RBG; and the number of RB/s comprised in at least one of the RBG that is located at an edge of the frequency carrier.

To select and apply an optimal allocation strategy, some evaluations will be performed in a systematic way in the following actions according to embodiments herein. The result of the evaluations will be compared to find which allocation strategy for RBs or RBGs allocation between the first RAT and second RAT, e.g. LTE and NR, that minimizes the allocation inefficiency by minimizing the over and under allocation to each.

The method may comprise any one or more of the actions below.

Action 501

First, the network node 110 will decide a starting point for the evaluations. Later on, in actions 504 and on, the network node 110 may decide another starting point such as the second RAT for yet further evaluations. A starting point when used herein refers to the RAT decided to start an evaluation with, e.g. the first RAT. The starting point will then be followed by another RAT decided to start a next evaluation with, e.g. the second RAT. There will be two bitmaps, one for First RAT, e.g. NR, and one for the second RAT, e.g. LTE. The edge most RB for NR will be different than that of LTE, or e.g. one for First RAT, e.g. LTE, and one for the second RAT, e.g. NR. Thus, the network node 110 decides that a starting point on the carrier for allocating the RBGs when evaluating a first allocation strategy is for the first RAT, to be followed by the second RAT when evaluating a second allocation strategy. The first RAT may e.g. be any one out of LTE or NR.

In some embodiments, the deciding that the starting point on the carrier for allocating the RBGs is for the first RAT, is based on an RB offset between the first RBGs in the first RAT and the second number of RBGs in the second RAT. When evaluating from the opposite edge, the offset is between last RBG in the first RAT and the last RBG in second RAT.

A starting point may refer to whether to start the allocation with the first RAT or the second RAT, e.g. with NR or LTE. A starting point of resource assignment is decided. This is because it will change depending on the RAT in question, this is since, for the same channel bandwidth there are extra PRBs on the spectrum edges for NR compared with LTE.

Action 502

The network node 110 evaluates a first allocation strategy. This evaluation comprises the following:

The network node 110 allocates with start from the decided first RAT starting point, a first number of RBGs to the first RAT. The first number of RBGs is based on a number of RBs requested for the first RAT.

The network node 110 then allocates to the second RAT a second number of RBGs by use of the RBs that remains on the carrier after occupation of the first number of RBGs. The second number should be no more than to meet a number of RBs requested for the second RAT.

This is to ensure that the number of requested RBs is assigned or to ensure that all RBGs assigned will comprise no more RBs than requested.

The network node 110 will then compute allocation inefficiency such as over and under allocation to each RAT, this is referred to as delta or difference. The difference when used herein means the over and under allocation of RBs, the optimal difference would be zero, i.e. no RBs over or under allocation of RBs. Inefficiency is arising due to RBG granular allocations. The over or under allocation of the RAT that is first to be served is a result of the RBGs having a granularity other than one RBs. Over allocation occur when the number of RBG are to comprise RBs more than requested by the RAT, and under allocation occur when the RBGs are to comprise RBs less than requested by the RAT.

The network node 110 computes a first difference between the number of RBs requested for the first RAT and a first number of RBs comprised in the first number of RBGs allocated to the first RAT. That is to find the amount of over or under allocation of RBs for the first RAT evaluated according to the first allocation strategy with the first RAT as starting point.

The network node 110 further computes a second difference between the number of RBs requested for the second RAT and a second number of RBs as comprised in the second number of RBGs. That is to find the amount of over or under allocation of RBs for the second RAT evaluated according to the first allocation strategy with the first RAT as starting point.

In some embodiments, the network node 110 evaluates the first allocation strategy according to the following: The network node 110 allocates the first number of RBGs to the first RAT, by allocating contiguous RBGs starting from a first edge of the frequency carrier, and allocating the second number of RBGs to the second RAT by allocating contiguous RBGs starting from the other edge of the frequency carrier.

Action 503

The network node 110 then evaluates a second allocation strategy. This second allocation strategy will later on be compared with the first allocation strategy to find the most suitable allocation strategy to use. The evaluation of the second allocation strategy comprises the following:

The network node 110 allocates to the decided second RAT, with start from the edge of the frequency carrier opposing that the starting point, a second number of RBGs to the second RAT. The second number of RBGs is based on a number of RBs requested for the second RAT.

The network node 110 then allocates to the first RAT, a first number of RBGs by use of the RBs that remains on the frequency carrier after occupation by the second number of RBGs. The first number of RBGs should be no more than to meet a requested number of RBs for the first RAT.

The network node 110 computes a first difference between the number of RBs requested for the second RAT and the second number of RBs as comprised in the second number of RBGs. That is to find the amount of over or under allocation of RBs or RBGs for the second RAT evaluated according to the second allocation strategy with the first RAT as starting point.

The network node 110 further computes a second difference between the number of RBs requested for the first RAT and a first number of RBs as comprised in the first number of RBGs. That is to find the amount of over or under allocation of RBs or RBGs for the first RAT evaluated according to the second allocation strategy with the first RAT as starting point.

In some embodiments, the network node 110 evaluates the second allocation strategy according to the following: The network node 110 allocates the second number of RBGs to the second RAT, by allocating contiguous RBGs starting from the first edge of the frequency carrier, and allocating the first number of the RBGs to the first RAT by allocating contiguous RBGs starting from the other edge of the frequency carrier.

Action 504

The network node 110 will then compare the results of the evaluations using the first RAT as starting point to find out which allocation strategy for allocating RBs or RBGs between the first RAT and second RAT, e.g. LTE and NR, that minimizes the allocation inefficiency by minimizing the over and under allocation to each RAT.

With the starting point being for the first RAT, the network node 110 thus selects an allocation strategy out of the first allocation strategy and second allocation strategy. This is based on the first difference and the second difference of the evaluated first strategy, and the first difference and second difference of the evaluated second strategy.

In some embodiments, the network node 110 selects the allocation strategy with the minimum difference out of the first difference and the second difference of the evaluated first allocation strategy and the first difference and second difference of the second allocation strategy.

An example is to select the strategy which has:

Selection Index[strategy]=[(delta_LTE_allocation)^+ (delta_NR_allocation)^] as the minimum. This means that for each allocation strategy a selection index in terms of cumulative allocation error value over NR allocation and LTE allocation may be computed as:

$$\text{Selection Index} = RB^{error}{}_{cummulative} = (RB^{allocate,error}NR)^2 + (RB^{allocate,error}LTE)^2.$$

Where $RB^{allocate,\ error}$ is the difference between requested and allocated RBs. This term represents the allocation error for that strategy.

Selected Strategy=min(Selection Index[strategy(i)]) where i donates each strategy.

This means that: Among the four strategies:
{NR Allocation starting from NR grid: fulfil NR request},
{NR Allocation starting from NR grid: fulfil LTE request},
{LTE Allocation starting from LTE grid: fulfil NR request},
{LTE Allocation starting from LTE grid: fulfil LTE request}, Select the strategy which has the minimum cumulative allocation error $RB^{error}{}_{cummulative}$. This will be the strategy where over or under allocation of RBs will be least for both RATs.

The method may be stopped after the selection of allocation strategy in Action 504. In some embodiments the evaluation of allocation strategies optionally continues by Actions 505-509 below.

Action 505

In some embodiments, to get a larger selection of allocation strategies to choose between, some further evaluations with another starting point will be performed. In these embodiments, the network node 110 may decide that a starting point on the carrier for allocating the RBs when evaluating a third allocation strategy is for the second RAT, to be followed by the first RAT when evaluating a fourth allocation strategy. The second RAT may e.g. be LTE if first RAT is NR or NR if first RAT is LTE.

The deciding that a starting point on the carrier for allocating the RBGs is for the second RAT, may be based on an RB offset between the first number of RBGs in the first RAT and the first number of RBGs in the second RAT. When evaluating from the opposite edge, the offset is between last RBG in the first RAT and the last RBG in second RAT.

Action 506

In these embodiments, the network node 110 evaluates the third allocation strategy. The evaluation of the third allocation strategy may comprise the following:

The network node 110 allocates, with start from the decided second RAT starting point, a second number of RBGs to the second RAT. The second number of RBGs is based on a number of RBs requested for the second RAT.

The network node 110 then allocates to the first RAT, a first number of RBGs by use of the RBs that remains on the carrier after occupation of the second number of RBGs. The first number should be no more than to meet a number of RBs requested for the first RAT.

The network node 110 computes a first difference between the number of RBs requested for the second RAT and a second number of RBs comprised in the second number of RBGs allocated to the second RAT. That is to find the amount of over or under allocation of RBs or RBGs for the second RAT evaluated according to the third allocation strategy with the second RAT as starting point.

The network node 110 further computes a second difference between the number of RBs requested for the first RAT and a first number of RBs as comprised in the first number of RBGs. That is to find the amount of over or under allocation of RBs or RBGs for the first RAT evaluated according to the fourth allocation strategy with the second RAT as starting point.

In some embodiments, the network node 110 evaluates the third allocation strategy according to the following: The network node 110 allocates the second number of RBGs to the second RAT, by allocating contiguous RBGs starting from a first edge of the frequency carrier, and allocating the first RBGs to the first RAT by allocating contiguous RBGs starting from the other edge of the frequency carrier.

Action 507

The network node 110 may then evaluate a fourth allocation strategy. This fourth allocation strategy will later on be compared with the third allocation strategy to find the most suitable allocation strategy to use. The fourth allocation strategy may comprise the following:

The network node 110 allocates to the decided first RAT, with start from the edge of the frequency carrier opposing that the starting point, a first number of RBGs to the first RAT. The first number of RBGs is based on a number of RBs requested for the first RAT. That is to find the amount of over or under allocation of RBs or RBGs for the first RAT evaluated according to the fourth allocation strategy with the first RAT as starting point.

The network node 110 then allocates to the second RAT, a second number of RBGs by use of the RBs that remains on the frequency carrier after occupation by the first number of RBGs. The second number of RBGs should be no more than to meet a requested number of RBs for the second RAT. That is to find the amount of over or under allocation of RBs or RBGs for the second RAT evaluated according to the fourth allocation strategy with the second RAT as starting point.

The network node 110 computes a first difference between the number of RBs requested for the first RAT and the first number of RBs as comprised in the first number of RBGs, The network node 110 further computing a second difference between the number of RBs requested for the second RAT and a second number of RBs as comprised in the second number of RBGs.

In some embodiments, the network node 110 evaluates the fourth allocation strategy according to the following: The network node 110 allocates the first number of RBGs to the first RAT, by allocating contiguous RBGs starting from the first edge of the frequency carrier, and allocating the second number RBGs to the second RAT by allocating contiguous RBGs starting from the other edge of the frequency carrier.

Action 508,

The network node 110 may then compare the results of the evaluations using the second RAT as starting point to find which allocation strategy for allocating RBs or RBGs between the first RAT and second RAT, e.g. LTE and NR, that minimizes the allocation inefficiency by minimizing the over and under allocation to each RAT.

With the starting point being for the second RAT, the network node 110 may selecting an allocation strategy out of the third allocation strategy and fourth allocation strategy based on the first difference and the second difference of the evaluated third strategy, and the first difference and second difference of the evaluated fourth strategy.

In some embodiments, the network node 110 may selecting an allocation strategy out of the first allocation strategy, the second allocation strategy, the third allocation strategy and the fourth allocation strategy based on: The first difference and the second difference of the evaluated first strategy, the first difference and second difference of the evaluated second strategy, the first difference and the second difference of the evaluated third strategy, and the first difference and second difference of the evaluated fourth strategy.

With the any one or more out of the first RAT or second RAT as starting point, any of the selecting (504 and 508) an allocation strategy out of the first allocation strategy and second allocation strategy, or third allocation strategy and fourth allocation strategy, may comprise selecting the allocation strategy with the minimum difference out of the first difference and the second difference of the evaluated first allocation strategy and second allocation strategy, or third allocation strategy and fourth allocation strategy.

Action 509

The network node 110 has now got a larger number of allocation strategies to choose between for deciding which allocation strategy to apply.

Therefore in some embodiments, the network node 110 applies any one out of: The selected allocation strategy with the first RAT as starting point, and the selected allocation strategy with the second RAT as starting point.

Which one of the allocation strategies to apply is decided based on:

The first RAT as starting point comprising the first difference and the second difference of the evaluated first strategy, and the first difference and second difference of the evaluated second strategy, and the second RAT as starting point first difference and the second difference of the evaluated third strategy, and the first difference and second difference of the evaluated fourth strategy.

In some embodiments, the applying any one out of: the selected allocation strategy with the first RAT as starting point, and the selected allocation strategy with the second RAT as starting point, comprises applying the allocation strategy with the minimum difference out of the first difference and the second difference of the evaluated first strategy, and the first difference and second difference of the evaluated second strategy.

The RBGs allocated to respectively the first RAT and second RAT may be in contiguous groups on the bandwidth of the carrier.

The embodiments described above will now be further explained and exemplified. The example embodiments described below may be combined with any suitable embodiment above.

In a scenario when both RATs are satisfied and there are resources remaining, the remaining resources such may be split such that: The resource utilization is maximized.

In an example, the LTE needed number of PRBs, may e.g. be 9. Then calculate the numbers of Physical Resource Blocks (PRB) to align with next NR RBG by assigning available 6 extra PRBs to LTE. By doing so NR RBGs may use remaining of the PRBs.

FIGS. 6A, 7A, 8A, 9A, 10A, and 11A depict examples of Physical Downlink Shared Channel (PDSCH) RBG impact. The NR no. and the LT no. represents the sequence numbering of RBs, from the starting point of respectively the NT and the LTE. The columns represent the RBs, and RBGs as distributed over the frequency bandwidth over the frequency carrier.

In FIGS. 6A, 7A, 8A, 9A, 10A, and 11A, N-RBG means a NR group of RBs (RBG), and L-RBG means an LTE RBG. In these FIGS. 6A, 7A, 8A, 9A, 10A, and 11A, the first RAT is represented by NR and the second RAT is represented by LTE. Black boxes in the grids represents unused spectrum. A grid when used herein refers to the spectrum. The start and end point of grid will depend on the RAT type.

Each of these FIGS. 6A, 7A, 8A, 9A, 10A, and 11A comprises four columns, each column (col.) representing a carrier. For each FIGS. 6A, 7A, 8A, 9A, 10A, and 11A, the columns starting from the left:

The first column (leftmost), represents NR (first RAT) as a starting point in a scenario according to Action 503 relating to evaluating the second allocation strategy.

Here the first number of RBs is allocated to LTE (the second RAT) by allocating contiguous RBGs starting from an edge of the frequency carrier opposite to that of the starting point, in the examples of FIGS. 6A, 7A, 8A, 9A, and 10A, from the bottom of the column, and then with the RBs that remain on the frequency carrier allocating RBGs to NR (the first RAT). The NR RBGs are allocated contiguously by start from the NR start point and on the opposite side of the frequency carrier as that of the LTE allocation. In the examples of FIGS. 6A, 7A, 8A, 9A, 10A, and 11A, NR is allocated at the top of the column. The RBs of the columns represent RBs distributed over different sub-carriers of the frequency carrier.

The second column represents NR (first RAT) as a starting point in a scenario according to Action 502 relating to evaluating the first allocation strategy.

Here the first number of RBs is allocated to NR (the first RAT), by allocating contiguous RBs starting from a first edge of the frequency carrier, and then allocating the rest of the RBs to LTE (the second RAT) by allocating contiguous RBs starting from the other edge of the frequency carrier.

The third column represents LTE (second RAT) as a starting point in a scenario according to Action 506 relating to evaluating a first allocation strategy.

Here the second number of RBs is allocated LTE (second RAT), by allocating contiguous RBs starting from a first edge of the frequency carrier, and then allocating the rest of the RBs to the NR(first RAT) by allocating contiguous RBs starting from the other edge of the frequency carrier.

The fourth column (right most column) represents LTE (second RAT) as a starting point in a scenario according to Action 507 relating to evaluating a second allocation strategy.

Here the first number of RBs is allocated to NR (the first RAT) by allocating contiguous RBs starting from the first edge of the frequency carrier, and allocating the rest of the RBs to LTE (the second RAT) by allocating contiguous RBs starting from the other edge of the frequency carrier.

The wording "needed" in the tables corresponds to requested number of RATs in of that embodiment. The wording "selection index" in the tables points to an allocation strategy among the four:
  {NR Allocation starting from NR grid: fulfil NR request},
  {NR Allocation starting from NR grid: fulfil LTE request},
  {LTE Allocation starting from LTE grid: fulfil NR request},
  {LTE Allocation starting from LTE grid: fulfil LTE request}.

Figure 6A:
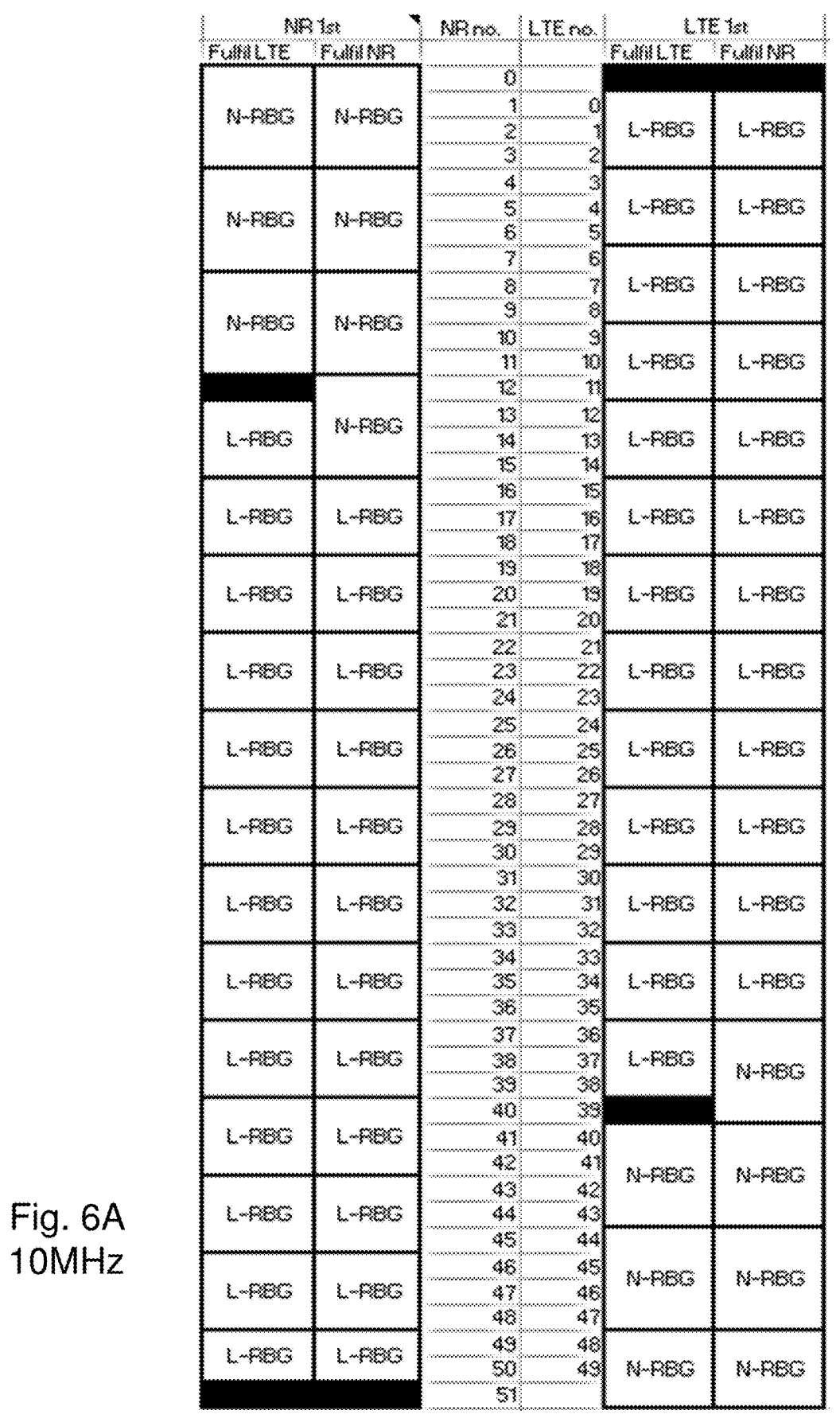

FIG. 6A depicts RBGs at 10 MHz carrier shared with 75% for LTE and 25% for NR. See the results in FIG. 6B, whereof the result showed in the bottom box of the table represents the column with the best delta value. In this example:
  Col. 1 has 0.5 over allocated RBs for LTE and 1 under allocated RBs for NR,
  Col. 2 has 2.5 under allocated RBs for LTE and 3 over allocated RBs for NR.
  Col. 3 has 1.5 over allocated RBs for LTE and 2 under allocated RBs for NR.
  Col. 4 has 1.5 under allocated RBs for LTE and 2 over allocated RBs for NR.

Thus the best choice would be the allocation strategy represented by Col. 1 which minimizes the allocation inefficiency by minimizing the over and under allocation. This means that cumulative allocation error over NR allocation and LTE allocation is minimum for this strategy among all strategies.

E.g. for 10 MHz:
NR start (lower edge): RB=−1,
LTE start (lower edge): RB=0
LTE end (upper edge): RB=49
NR end (upper edge): RB=50, For FIG. 6, strategy in Col. 1 has the overall cumulative allocation error, over allocating LTE by 0.5 and under allocating NR by 1 RB than the requested no. of RBs.

Figure 7A:
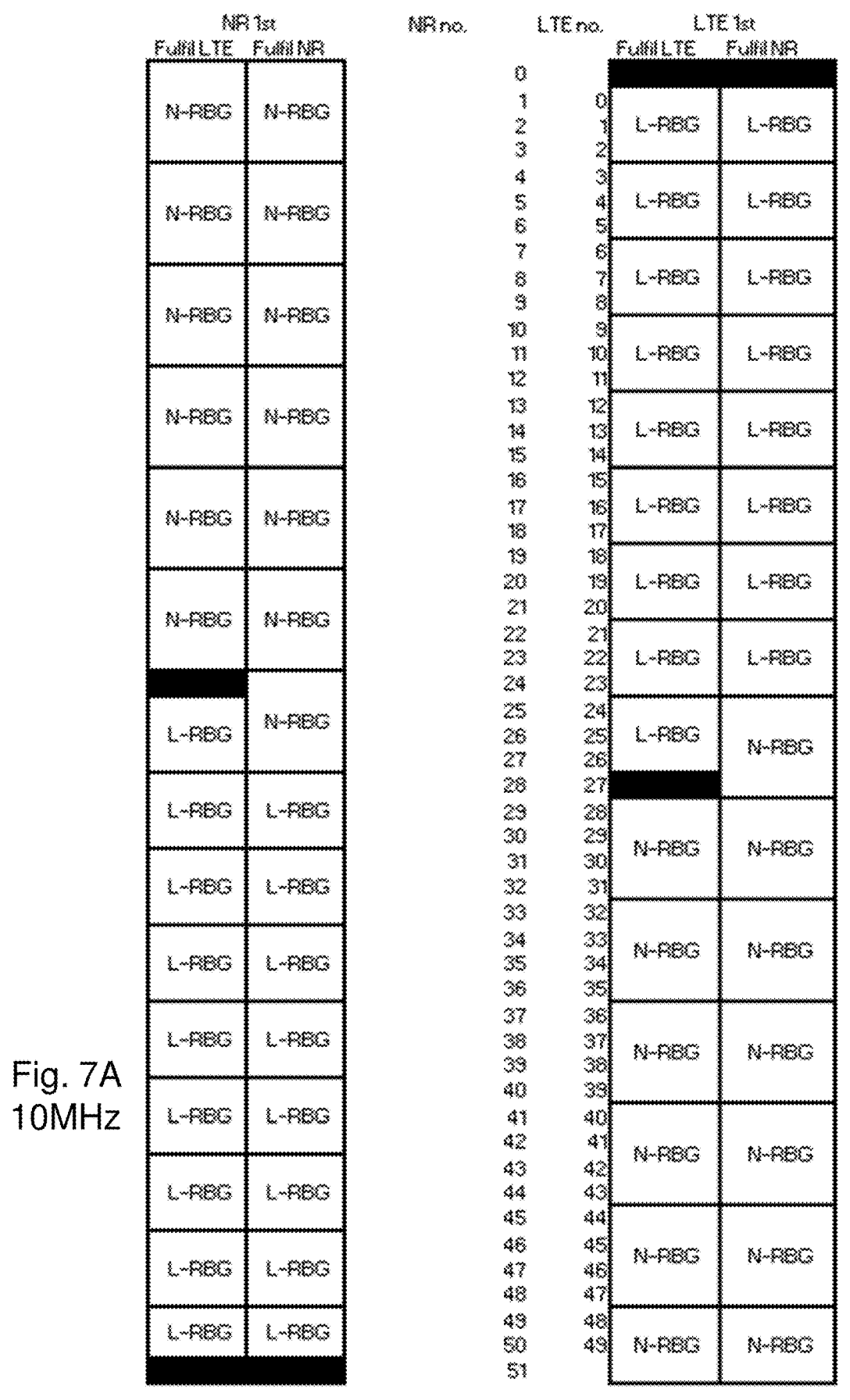

FIG. 7A depicts RBGs at a 10 MHz carrier shared with 50% for LTE and 50% for NR. See the results in FIG. 7B, whereof the result in the bottom box of the table represents the column with the best delta value. In the tables, Unused means unused RBGs.
  Col. 1 has 1 over allocated RBs for LTE and 2 under allocated RBs for NR,
  Col. 2 has 2 under allocated RBs for LTE and 2 over allocated RBs for NR.
  Col. 3 has 2 over allocated RBs for LTE and 3 under allocated RBs for NR.
  Col. 4 has 1 under allocated RBs for LTE and 1 over allocated RBs for NR.

Thus the best choice would be the allocation strategy represented by Col. 4 which minimizes the allocation inefficiency by minimizing the over and under allocation. This means that a cumulative allocation error over NR allocation and LTE allocation is minimum for this strategy among all strategies.

Figure 8A:
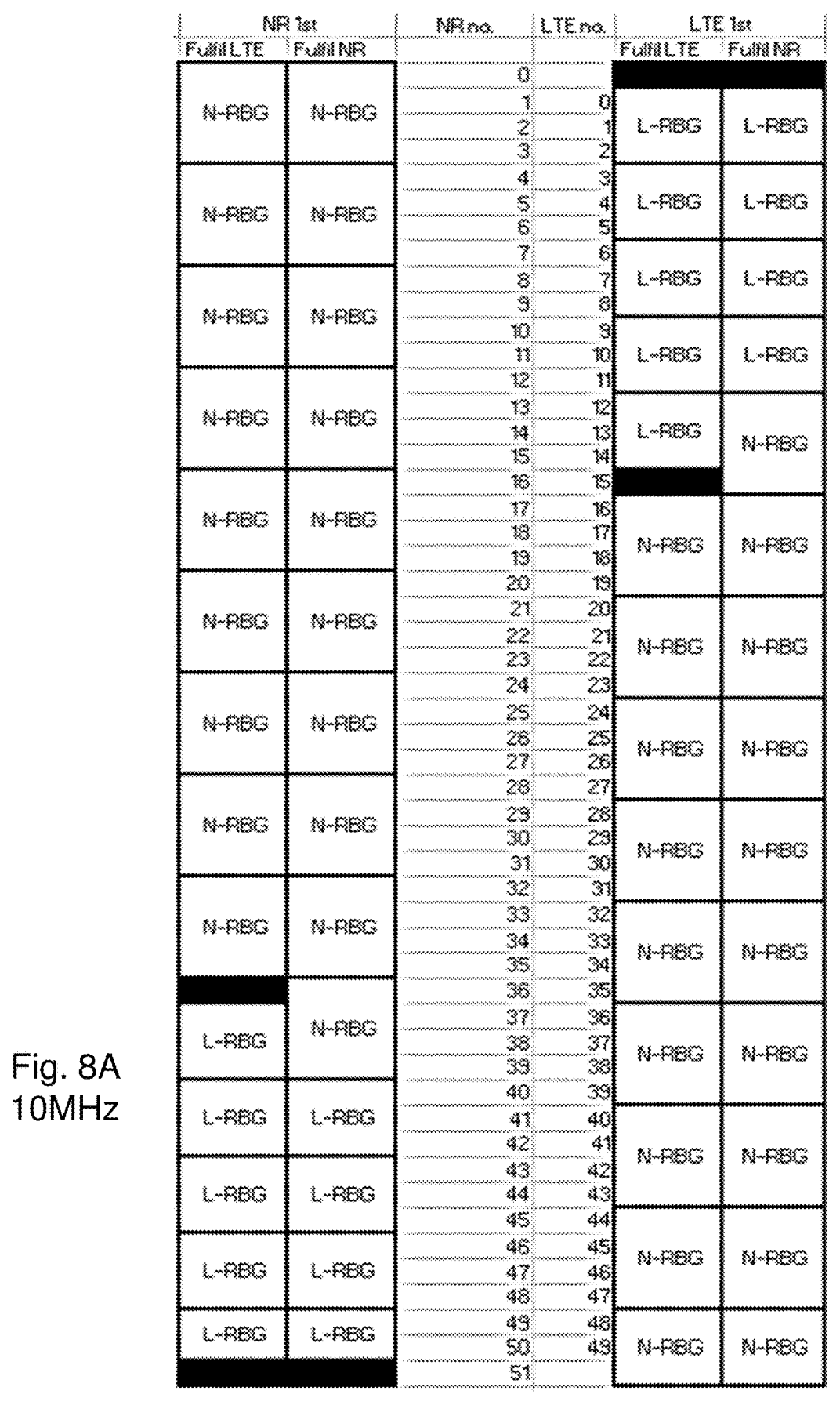

FIG. 8A depicts RBGs at a 10 MHz carrier shared with 25% for LTE and 75% for NR. See the results in FIG. 8B, whereof the result in the bottom box of the table represents the column with the best delta value.
  Col. 1 has 1.5 over allocated RBs for LTE and 3 under allocated RBs for NR,
  Col. 2 has 1.5 under allocated RBs for LTE and 1 over allocated RBs for NR.
  Col. 3 has 2.5 over allocated RBs for LTE and 4 under allocated RBs for NR.
  Col. 4 has 0.5 under allocated RBs for LTE and no over allocated or under allocated RBs for NR.

Thus the best choice would be the allocation strategy represented by Col. 4 which minimizes the allocation inefficiency by minimizing the over and under allocation. This means that a cumulative allocation error over NR allocation and LTE allocation is minimum for this strategy among all strategies.

Figure 9A:
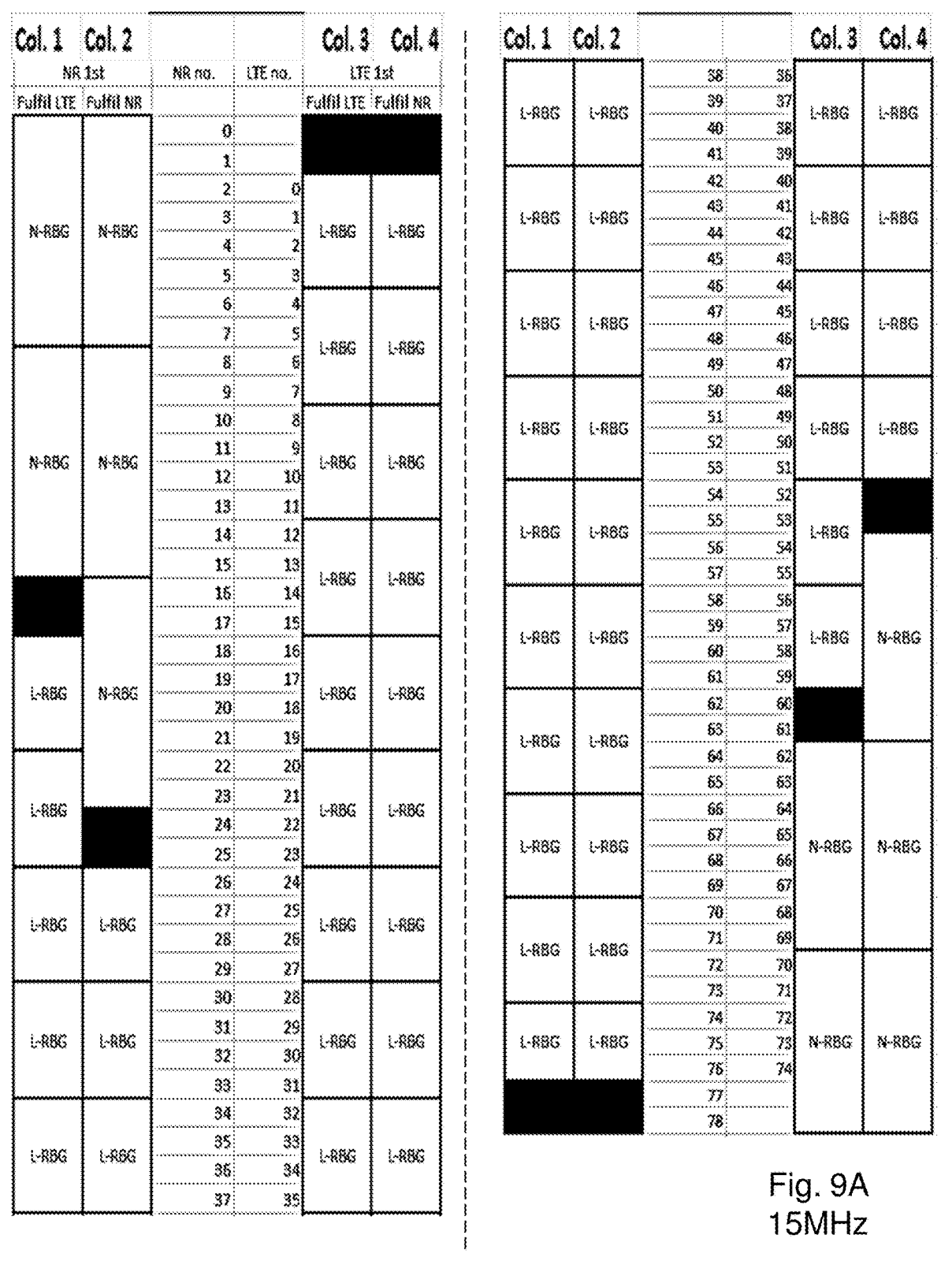

FIG. 9A depicts RBGs at 15 MHz carrier shared with 75% for LTE and 25% for NR. See the results in FIG. 9B, whereof the result in the bottom box of the table represents the column with the best delta value.

Col. 1 has 2.75 over allocated RBs for LTE and 3.75 under allocated RBs for NR,

Col. 2 has 5.25 under allocated RBs for LTE and 4.25 over allocated RBs for NR.

Col. 3 has 1.5 under allocated RBs for LTE and 2 over allocated RBs for NR.

Col. 4 has 4.25 under allocated RBs for LTE and 3.25 over allocated RBs for NR.

Thus the best choice would be the allocation strategy represented by Col. 3 which minimizes the allocation inefficiency by minimizing the over and under allocation. This means that a cumulative allocation error over NR allocation and LTE allocation is minimum for this strategy among all strategies.

Figure 10A:
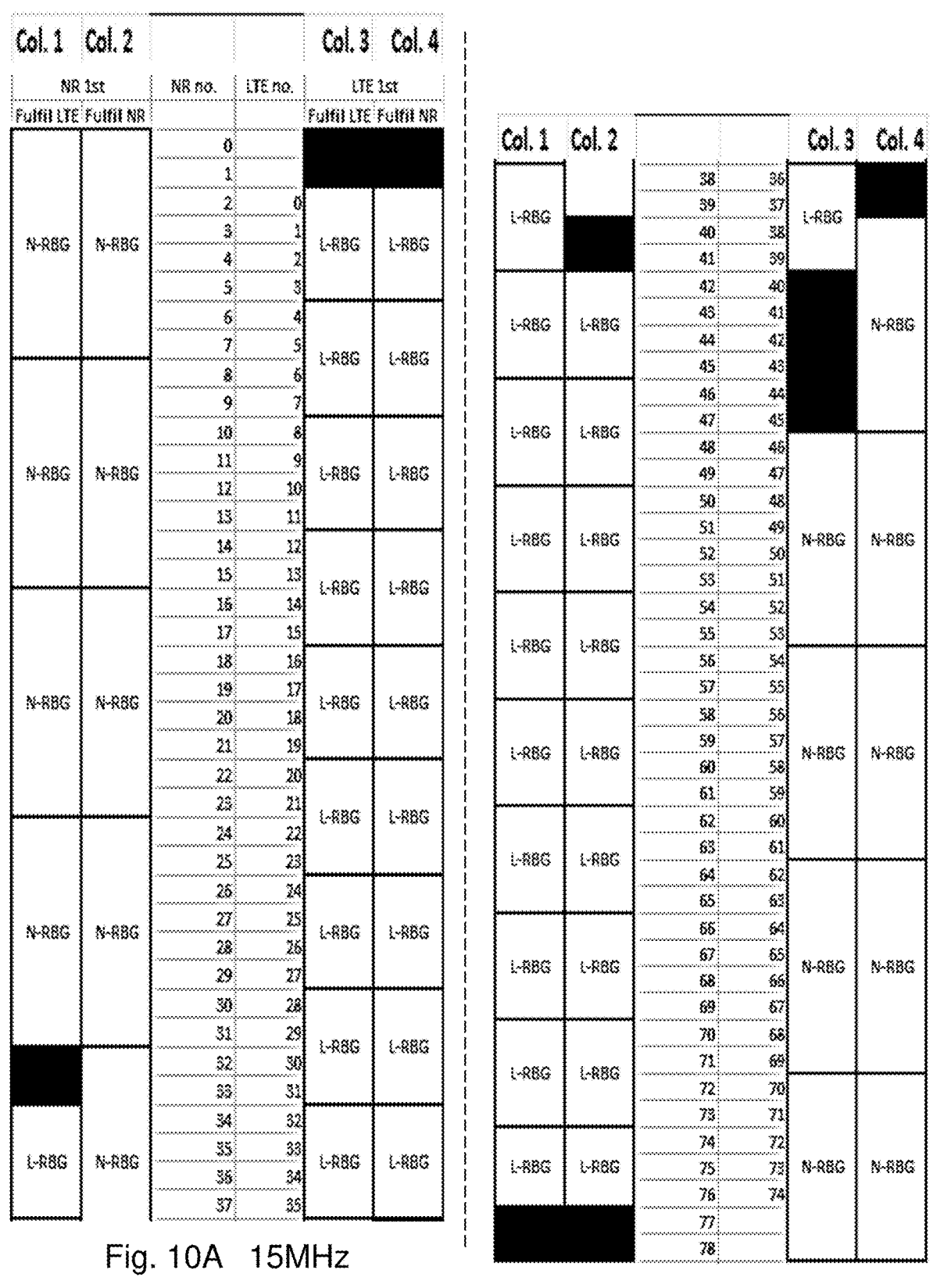

FIG. 10A depicts RBGs at 15 MHz carrier shared with 50% for LTE and 50% for NR. See the results in FIG. 10B, whereof the result in the bottom box of the table represents the column with the best delta value.

Col. 1 has 5.5 over allocated RBs for LTE and 7.5 under allocated RBs for NR,

Col. 2 has 2.5 under allocated RBs for LTE and 0.5 over allocated RBs for NR.

Col. 3 has 2.5 over allocated RBs for LTE and 8.5 under allocated RBs for NR.

Col. 4 has 1.5 under allocated RBs for LTE and 0.5 under allocated RBs for NR.

Thus the best choice would be the allocation strategy represented by Col. 4 which minimizes the allocation inefficiency by minimizing the over and under allocation. This means that a cumulative allocation error over NR allocation and LTE allocation is minimum for this strategy among all strategies.

Figure 11A:
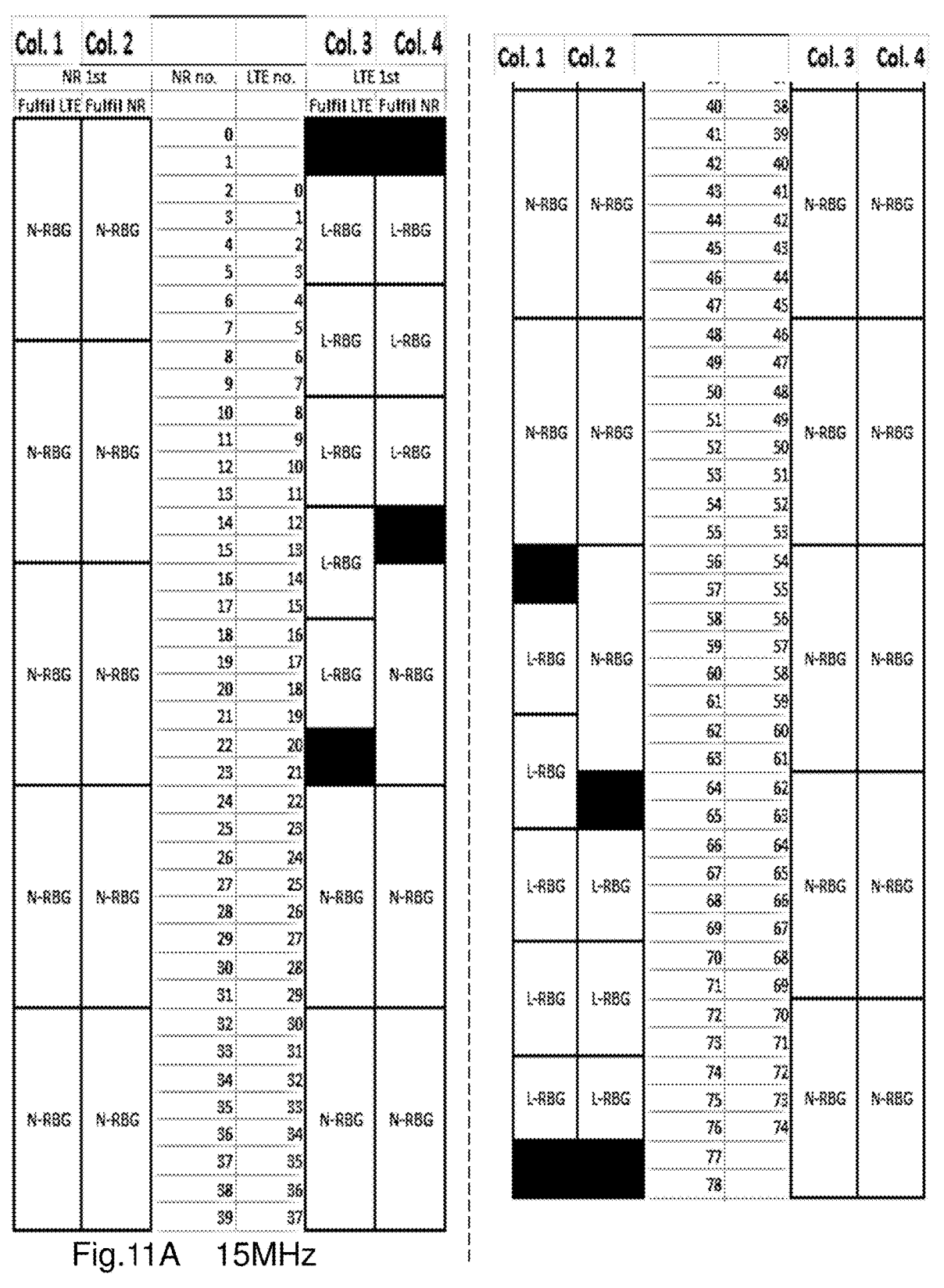

FIG. 11A depicts RBGs at 15 MHz carrier shared with 25% for LTE and 75% for NR. See the results in FIG. 11B, whereof the result in the bottom box of the table represents the column with the best delta value.

Col. 1 has 0.25 over allocated RBs for LTE and 3.25 under allocated RBs for NR,

Col. 2 has 7.75 under allocated RBs for LTE and 4.75 over allocated RBs for NR.

Col. 3 has 1.25 under allocated RBs for LTE and 4.25 under allocated RBs for NR.

Col. 4 has 6.75 under allocated RBs for LTE and 3.75 over allocated RBs for NR.

Thus the best choice would be the allocation strategy represented by Col. 1 which minimizes the allocation inefficiency by minimizing the over and under allocation. This means that a cumulative allocation error over NR allocation and LTE allocation is minimum for this strategy among all strategies.

According to example embodiments herein, the following may be assumed before the method, also referred to as an algorithm, starts:

The first RAT and the second RAT, e.g. LTE and NR, are sharing a common spectrum, e.g. with different numbers of RBs for same bandwidth and different RBG sizes.

Resource allocation type is 0 for both first and second RATs.

The network node 110 such as its Scheduler, may have decided about the number, ratio or percentage of needed RBs which will be shared in an upcoming Transmission Time Interval (TTI) or successive multiple TTIs. This number is less than maximum RBs for each of the first and second RAT.

Resources for static repetitive signals may already have been excluded when calculating the available resources in current TTI or successive multiple TTIs.

An Example of Embodiments Herein May Comprise Following Actions:

An Example of a Main Loop of the Method:

The network node 110 may use NR RB offset=(Total RBs NR−Total RBs LTE)/2 to determining whether the starting point shall be first or second RAT based on based on a calculated offset. This means that NR Allocation is starting from the NR grid or LTE Allocation is starting from the LTE grid.

When using the first RAT, e.g. NR grid, as a start point for resource allocation, there is no need of the offset. This is since NR RBG aligns with the start point.

For a decided resource assignment allocation start point being the second RAT e.g. LTE grid the offset shall be considered. This is due to lesser number of RBs on the LTE grid.

For an Allocation strategy e.g. first and/or second Allocation strategy, allocate at least requested RBs, what each technology want to get and/or requests: allocate on best-effort basis evaluating and determining strategy based on Calculated numbers of RBs allocated for that RAT and strategy.

Computed Delta for that RAT and strategy taking the number of RBs allocated in previous action minus the number of RBs needed.

End

End and select the strategy with less over allocated and under allocated.

Select the resource RB where Delta, i.e. difference, is minimum for both RATs.

Calculate Number of RBs Allocated for Each RAT and Strategy as Below:

If the starting point for assigning resources is decided to be from the NR grid in the shared RB grid, the starting point of resource reservation will be NR in the shared RB grid. Here, the first RAT NR is decided to be starting point in an example of Action 501. Perform as follows:

If the Allocation strategy is to allocate at least the needed RBGs for NR, reserve resources for NR first and allocate the RBGs from start of the shared RBGs grid. This is an example of evaluating the first allocation strategy related to the above described Action 502 in an embodiment where the first RAT is NR and the second RAT is LTE. Calculate the following:

Calculate the number of RBGs allocated for NR=CEIL (Number of Needed RBs/NR RBG size). Ceil is a function which rounds a value upwards e.g. ceil(5.1)=6, Floor is a function which rounds a value downwards e.g. floor(5.1)=5. When allocation strategy must fulfil requirement, ceil( ) function is used to calculate the No. of RBGs.

Calculate the number of RBs allocated for NR=Number of RBGs allocated NR*NR RBG size. This means that the number of RBs for allocation may be greater than requested.

Calculate the number of RBGs allocated for LTE=1 (Last RBG)+FLOOR((Total RBs LTE−Last RBG size)−(Number of RBs allocated NR−NR RB offset))/LTE RBG size). This means that after allocation to NR, the RBs remaining on LTE grid is calculated and they are then allocated to LTE in RBG.

Calculate the number of RBs allocated for LTE=Last RBG size+(Number of RBGs allocated LTE−1)*LTE RBG size. This means that they are converted from RBG to RBs.

If the Allocation strategy is to allocate at least the needed RBGs for LTE, reserve resources for LTE first but start from the end of the shared RBGs grid, and then allocate the RBGs in a best-effort resource reservation for NR. This is an example of evaluating the second allocation strategy related to the above described Action 503 in an embodiment where the first RAT is NR and the second RAT is LTE.

Calculate the Following:
Calculate the Number of RBGs allocated for LTE=1(Last RBG)+CEIL((Number of Needed RBs−Last RBG size)/LTE RBG size) This means that the Allocation to LTE is starting from the opposite end of the LTE grid.
Calculate the Number of RBs allocated for LTE=Last RBG size+(Number of RBGs LTE−1)*LTE RBG size. This means that the allocation to LTE is converted from RBGs to RBs.
Calculate the Number of RBGs allocated for NR=FLOOR((Total RBs NR−NR RB offset−Number of RBs LTE)/NR RBG size). This means that after the allocation to LTE, the RBs remaining on NR grid are calculated and they are then allocated to NR in RBG.
Calculate the Number of RBs allocated for NR=Number of RBGs NR*NR RBG size. This means an Allocation to NR converted from RBGs to RBs.

If the starting point for assigning resources is decided to be from the LTE grid; the starting point of resource reservation will be LTE in the shared RB grid. Here, the second RAT LTE is decided to be starting point related to in an example of Action 505. Perform as follows:

If the Allocation strategy is to allocate at least the needed RBGs for NR, reserve resources for NR first but from the end of the shared RBGs grid. This is an example of evaluating the third allocation strategy related to the above described Action 506 in an embodiment where the first RAT is NR and the second RAT is LTE.

Calculate the following:
Calculate the number of RBGs allocated for NR=1(Last RBG)+CEIL((Number of Needed RBs−Last RBG size)/NR RBG size). This means that the Allocation to NR is starting from the end of the NR grid.
Calculate the number of RBs allocated for NR=Last RBG size+(Number of RBGs NR−1)*NR RBG size. This means an RBG to RB conversion.
Calculate the number of RBGs allocated for LTE=FLOOR((Total RBs NR−NR RB offset−Number of RBs NR))/LTE RBG size)). This means that after allocation to NR, the RBs remaining on LTE grid calculated and they are then allocated to LTE in RBG.
Calculate the number of RBs allocated for LTE=Number of RBGs*LTE RBG size. This means an RBG to RB conversion.

If the Allocation strategy is to allocate at least the needed RBGs for LTE, reserve resources for LTE first from the start of the shared RBGs grid, and then a best-effort resource reservation for NR. This is an example of evaluating the fourth allocation strategy related to the above described Action 507 in an embodiment where the first RAT is NR and the second RAT is LTE.

Calculate the Following:
Calculate the number of RBGs allocated for LTE=CEIL (Number of Needed RBs/LTE RBG size). This means an allocation to LTE starting from LTE grid.
Calculate the number of RBs allocated for LTE=Number of RBGs allocated LTE*LTE RBG size. This means an RBG to RB conversion.
Calculate the number of RBGs allocated for NR=1(Last RBG)+FLOOR((Total RBs NR−Last RBG size)−(Number of RBs allocated LTE−NR RB offset))/NR RBG size). This means that after the allocation to LTE, the RBs remaining on NR grid are calculated and they are then allocated to NR in RBG.
Calculate the number of RBs allocated for NR=Last RBG size+(Number of RBGs allocated NR−1)*NR RBG size. This means an RBG to RB conversion.

Application of this is depicted in the above FIGS. 6A, 7A, 8A, 9A, 10A, and 11A illustrating RBGs for 10 MHz and 15 MHz of shared spectrum.

Figure 12:
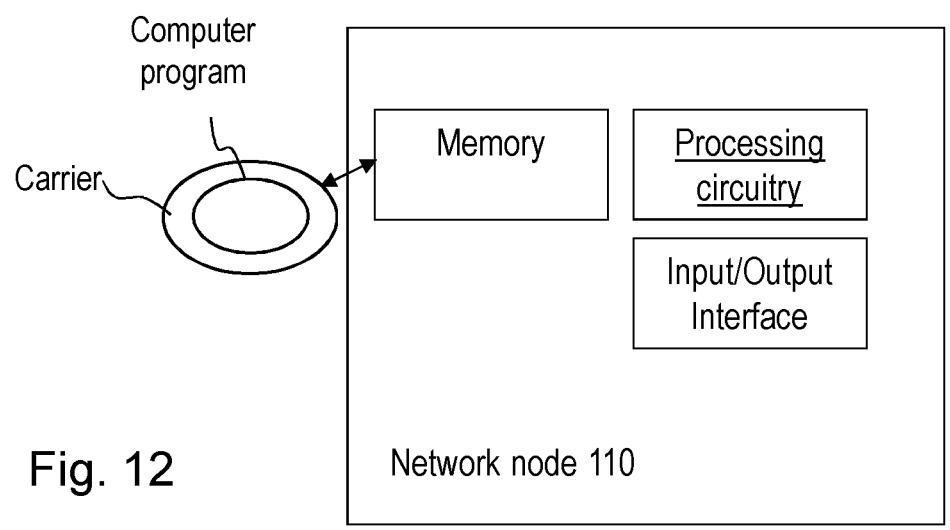
FIGS. 12 and 13 show an example of the network node 110.
Figure 13:
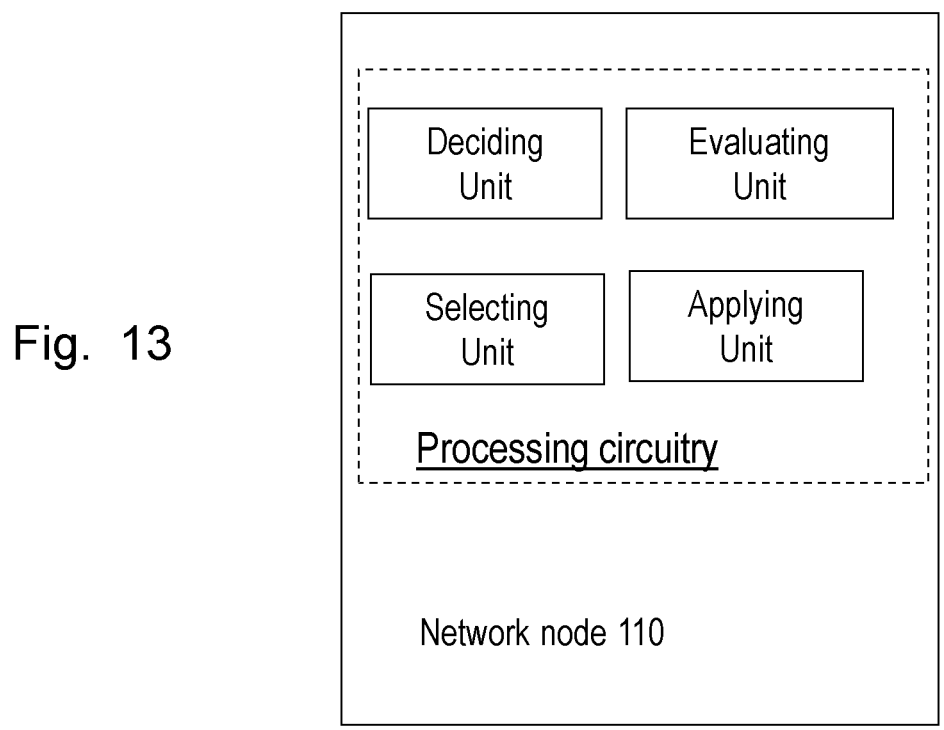

FIGS. 12 and 13 show an example of the network node 110.

The network node 110 may comprise a respective input and output interface configured to communicate with the UE 120, see FIG. 12. The input and output interface may comprise a wireless receiver (not shown) and a wireless transmitter (not shown).

The network node 110 may further comprise a deciding unit, an evaluating unit, a selecting unit and an applying unit, see FIG. 13.

The network node 110 is configured to select an allocation strategy for allocating (RBGs), on a frequency carrier to respectively a first RAT and a second RAT for radio communication with the UE 120. The resource allocation type 0 is adapted to be used for allocation of RBGs to both the first RAT and to the second RAT, wherein each RBG is adapted to comprise one or more RBs.

The resource allocation type 0 may be adapted to indicate an allocated RBG with respect to a grid of RBs having a start point RB, and where there is adapted to be a difference between the first and second RAT in respect of at least one of: A distance from the centre of the frequency carrier to the start point RB; the number of RBs comprised in the RBG; and the number of RBs comprised in at least one of the RBG that is located at an edge of the frequency carrier.

The network node 110 is further configured to, e.g. by means of the deciding unit, decide that a starting point on the carrier for allocating the RBGs when evaluating a first allocation strategy is for the first RAT, to be followed by the second RAT when evaluating a second allocation strategy.

The network node 110 is further configured to, e.g. by means of the evaluating unit, evaluate a first allocation strategy by allocate with start from the decided first RAT starting point, a first number of RBGs to the first RAT, wherein the first number of RBGs is adapted to be based on number of RBs requested for the first RAT, then allocate to the second RAT a second number of RBGs by use of the RBs that remains on the carrier after occupation of the first number of RBGs, whereas the second number should be no more than to meet a number of RBs requested for the second RAT, and compute a first difference between the number of RBs requested for the first RAT and a first number of RBs comprised in the first number of RBGs allocated to the first RAT, and compute a second difference between the number of RBs requested for the second RAT and a second number of RBs as comprised in the second number of RBGs.

The network node 110 is further configured to, e.g. by means of the evaluating unit, then evaluate a second allocation strategy, by allocate to the decided second RAT, with start from the edge of the frequency carrier opposing that the starting point, a second number of RBGs to the second RAT, wherein the second number of RBGs is adapted to be based on a number of RBs requested for the second RAT, then allocate to the first RAT, a first number of RBGs by use of the RBs that remains on the frequency carrier after occupation by the second number of RBGs, whereas the first number of RBGs should be no more than to meet a requested number of RBs for the first RAT, and compute a first difference between the number of RBs requested for the second RAT and the second number of RBs as comprised in the second number of RBGs, and compute a second difference between the number of RBs requested for the first RAT and a first number of RBs as comprised in the first number of RBGs.

The network node 110 is further configured to, e.g. by means of the selecting unit, with the starting point being for the first RAT, select an allocation strategy out of the first allocation strategy and second allocation strategy based on the first difference and the second difference of the evaluated first strategy, and the first difference and second difference of the evaluated second strategy.

The network node 110 may further be configured to, e.g. by means of the evaluating unit,
evaluate a first allocation strategy comprising: allocate the first number of RBGs to the first RAT, by allocating contiguous RBGs starting from a first edge of the frequency carrier, and allocate the second number of RBGs to the second RAT by allocating contiguous RBGs starting from the other edge of the frequency carrier, and,
evaluate a second allocation strategy comprising: allocate the second number of RBGs to the second RAT, by allocating contiguous RBGs starting from the first edge of the frequency carrier, and allocate the first number of the RBGs to the first RAT by allocating contiguous RBGs starting from the other edge of the frequency carrier.

The network node 110 may further be configured to, e.g. by means of the deciding unit, decide that a starting point on the carrier for allocating the RBs when evaluating a third allocation strategy is for the second RAT, to be followed by the first RAT when evaluating a fourth allocation strategy.

The network node 110 may further be configured to, e.g. by means of the evaluating unit, evaluate the third allocation strategy by allocating with start from the decided second RAT starting point, a second number of RBGs to the second RAT, wherein the second number of RBGs is adapted to be based on a number of RBs requested for the second RAT, then allocate to the first RAT a first number of RBGs by use of the RBs that remains on the carrier after occupation of the second number of RBGs, whereas the first number should be no more than to meet a number of RBs requested for the first RAT, and compute a first difference between the number of RBs requested for the second RAT and a second number of RBs comprised in the second number of RBGs allocated to the second RAT, and compute a second difference between the number of RBs requested for the first RAT and a first number of RBs as comprised in the first number of RBGs.

The network node 110 may further be configured to, e.g. by means of the evaluating unit, then evaluate a fourth allocation strategy, by allocate to the decided first RAT, with start from the edge of the frequency carrier opposing that the starting point, a first number of RBGs to the first RAT, wherein the first number of RBGs is adapted to be based on a number of RBs requested for the first RAT, then allocating to the second RAT, a second number of RBGs by use of the RBs that remains on the frequency carrier after occupation by the first number of RBGs, whereas the second number of RBGs should be no more than to meet a requested number of RBs for the second RAT, and compute a first difference between the number of RBs requested for the first RAT and the first number of RBs as comprised in the first number of RBGs, and computing a second difference between the number of RBs requested for the second RAT and a second number of RBs as comprised in the second number of RBGs, The network node 110 may further be configured to, e.g. by means of the selecting unit, with the starting point being for the second RAT, select an allocation strategy out of the third allocation strategy and fourth allocation strategy based on the first difference and the second difference of the evaluated third strategy, and the first difference and second difference of the evaluated fourth strategy.

The network node 110 may further be configured to, e.g. by means of the evaluating unit:
Evaluate the third allocation strategy comprising: allocate the second number of RBGs to the second RAT, by allocating contiguous RBGs starting from a first edge of the frequency carrier, and allocate the first RBGs to the first RAT by allocating contiguous RBGs starting from the other edge of the frequency carrier, and,
evaluate the fourth allocation strategy comprising: allocate the first number of RBGs to the first RAT, by allocating contiguous RBGs starting from the first edge of the frequency carrier, and allocate the second number RBGs to the second RAT by allocating contiguous RBGs starting from the other edge of the frequency carrier.

The network node 110 may further configured to, e.g. by means of the selecting unit, with the any one or more out of the first RAT or second RAT as starting point, any of the select an allocation strategy out of the first allocation strategy and second allocation strategy, or third allocation strategy and fourth allocation strategy, by selecting the allocation strategy with the minimum difference out of the first difference and the second difference of the evaluated first allocation strategy and second allocation strategy, or third allocation strategy and fourth allocation strategy.

The network node 110 may further configured to, e.g. by means of the applying unit, apply any one out of: the selected allocation strategy with the first RAT as starting point, and the selected allocation strategy with the second RAT as starting point, based on the first RAT as starting point first difference and the second difference of the evaluated first strategy, and the first difference and second difference of the evaluated second strategy, and the second RAT as starting point first difference and the second difference of the evaluated third strategy, and the first difference and second difference of the evaluated fourth strategy.

The network node 110 may further configured to, e.g. by means of the applying unit, apply any one out of: the selected allocation strategy with the first RAT as starting point, and the selected allocation strategy with the second RAT as starting point, by applying the allocation strategy with the minimum difference out of the first difference and the second difference of the evaluated first strategy, and the first difference and second difference of the evaluated second strategy.

The RBGs allocated to respectively the first RAT and second RAT may be adapted to be in contiguous groups on the bandwidth of the carrier.

The network node 110 may further configured to, e.g. by means of the deciding unit, any one out of decide that the starting point on the carrier for allocating the RBGs is for the first RAT, and decide that a starting point on the carrier for allocating the RBGs is for the second RAT, are adapted to be based on an RB offset between the first RBGs in the first RAT and the second number of RBGs in the second RAT.

The embodiments herein may be implemented through a respective processor or one or more processors, such as the respective processor of a processing circuitry in the network node 110, and depicted in FIGS. 12 and 13, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a respective memory comprising one or more memory units. Each memory comprises instructions executable by the processor in the network node 110.

Each respective memory is arranged to be used to store evaluations, evaluations, selections, information, data, configurations, and applications to perform the methods herein when being executed in the network node 110.

In some embodiments, a respective computer program comprises instructions, which when executed by the at least one processor, cause the at least one processor of the network node 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 110, that when executed by the respective one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Further Extensions and Variations

Figure 14:
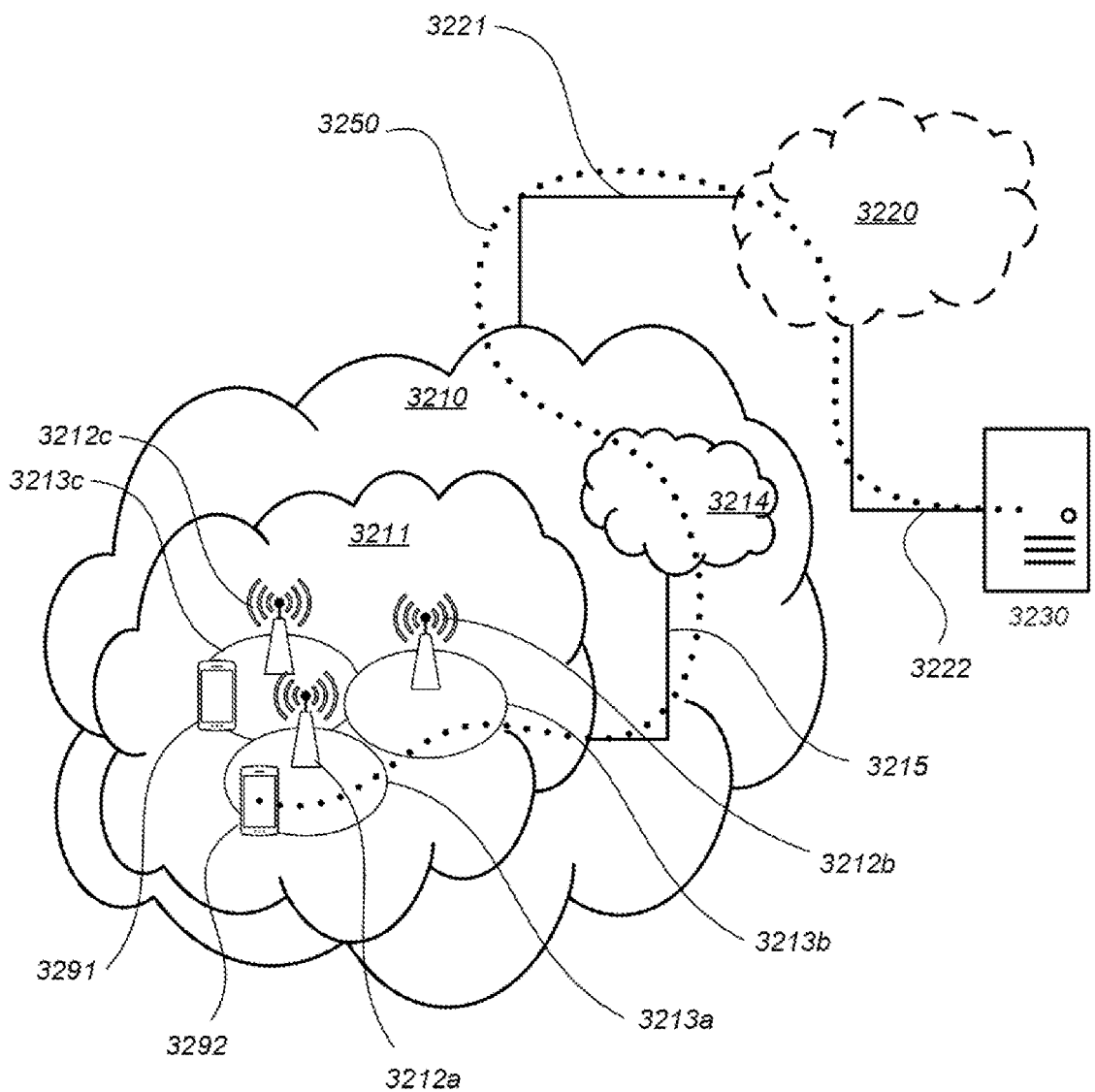
FIG. 14 schematically illustrates a telecommunication network connected via an intermediate network to a host computer.

With reference to FIG. 14, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
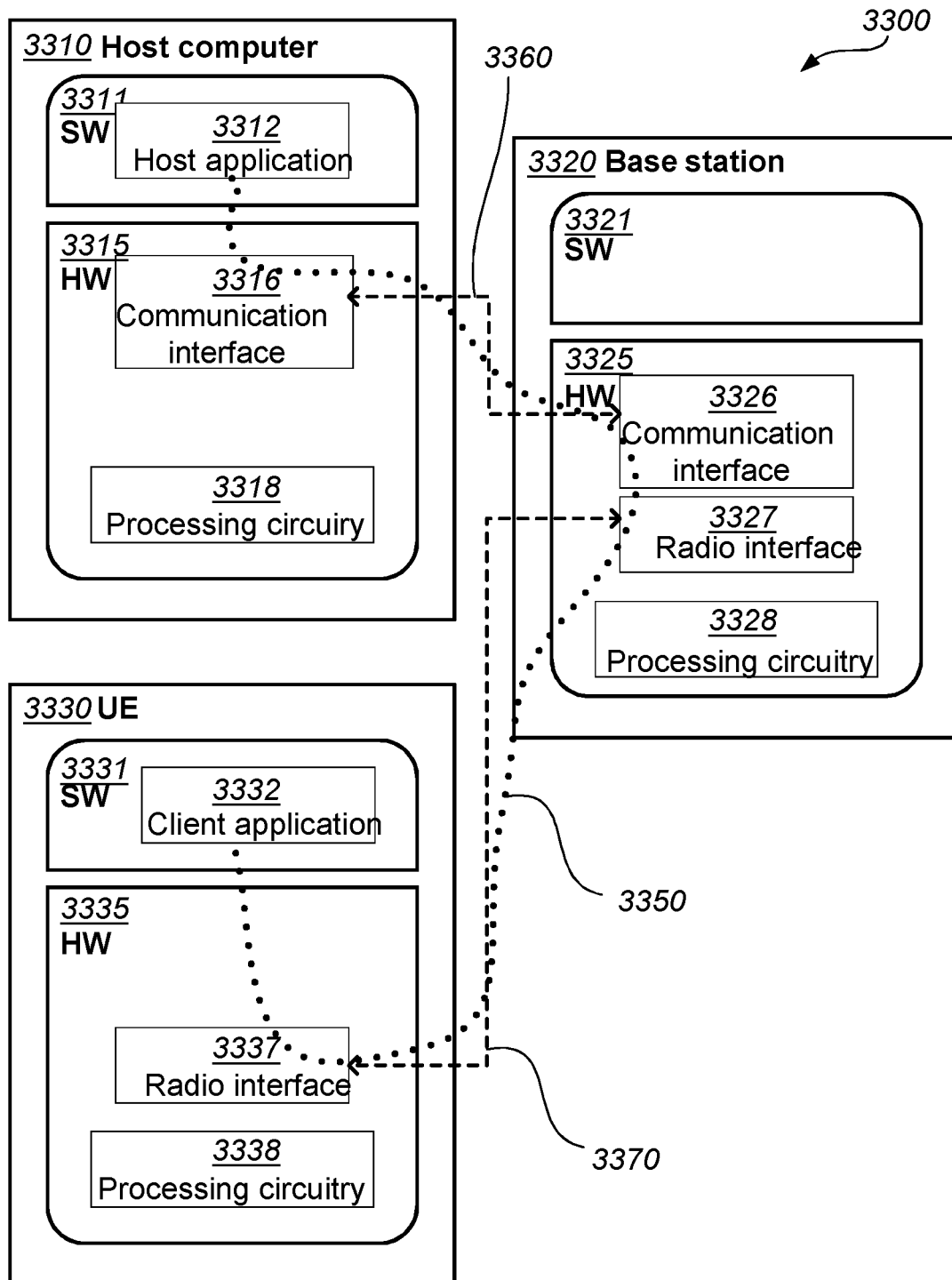
FIG. 15 is a generalized block diagram of a host computer communicating via a base station with a user equipment over a partially wireless connection.

It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 16, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 16 is a flowchart illustrating a method implemented in a communication system, in accordance with one embodiment. The communication system includes a host computer, a base station such as the network node 110, and a UE such as the UE 120, which may be those described with reference to FIG. 14 and FIG. 15. For simplicity of the present disclosure, only drawing references to FIG. 16 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 17 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 14 and FIG. 15. For simplicity of the present disclosure, only drawing references to FIG. 18 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station such as an AP STA, and a UE such as a Non-AP STA which may be those described with reference to FIG. 14 and FIG. 15. For simplicity of the present disclosure, only drawing references to FIG. 19 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

| Abbreviation | Explanation |
| --- | --- |
| NR | Next Radio |
| LTE | Long term evolution |
| MAC | Medium Access Control |

-continued

| Abbreviation | Explanation |
| --- | --- |
| UL | Uplink |
| DL | Downlink |
| RB | Resource Block |
| RBG | Resource Block Group |
| PDCCH | Physical Downlink Control Channel |
| PUSCH | Physical Uplink Shared Channel |
| PDSCH | Physical Downlink Shared Channel |

Below, some example embodiments 1-26 are shortly described. See e.g. FIGS. 1, 4, 5, 12, and 13.

1. A method performed by a network node 110 for applying an allocation strategy for allocating Resource Block, RBs, to be a shared on a frequency carrier to respectively a first Radio Access technology, RAT, and to a second RAT for radio communication with a User Equipment, UE, 120, which first RAT and second RAT are sharing a bandwidth of the frequency carrier wherein a resource allocation type 0 is used for allocation of the RBs to both the first RAT and to the second RAT, the method comprising:
    deciding 501 that a starting point on the carrier for allocating the RBs is for the first RAT, e.g., the first RAT may e.g. be any one out of LTE or NR
    evaluating 502 a first allocation strategy with the decided first RAT starting point by: allocating a first number of RBs to the first RAT, wherein the first number of RBs is based on a number of RBs requested for the first RAT, then allocating the rest of the RBs to the second RAT, up to a second number of RBs that meets the requested number for the second RAT, and computing a first difference between the number of RBs requested for the first RAT and the first number of RBs allocated to the first RAT, and computing a second difference between the number of RBs requested for the second RAT and the second number of RBs,
    then evaluating 503 a second allocation strategy, comprising: allocating a second number of RBs to the second RAT, wherein the second number of RBs is based on a number of RBs requested for the second RAT, then allocating the rest of the RBs to the first RAT, up to a first number of RBs that meets the requested number for the first RAT, and computing a first difference between the number of RBs requested for the second RAT and the second number of RBs allocated to the second RAT, and computing a second difference between the number of RBs requested for the first RAT and the first number of RBs,
    with the first RAT as starting point selecting 504 an allocation strategy out of the first allocation strategy and second allocation strategy based on the first difference and the second difference of the evaluated first strategy, and the first difference and second difference of the evaluated second strategy.

2. The method according to embodiment 1, wherein:
    evaluating 502 a first allocation strategy comprises: allocating the first number of RBs to the first RAT, by allocating contiguous RBs starting from a first edge of the frequency carrier, and allocating the rest of the RBs to the second RAT by allocating contiguous RBs starting from the other edge of the frequency carrier, and wherein,
    evaluating 503 a second allocation strategy comprises: allocating the second number of RBs to the second RAT, by allocating contiguous RBs starting from the first edge of the frequency carrier, and allocating the rest of the RBs to the first RAT by allocating contiguous RBs starting from the other edge of the frequency carrier.

3. The method according to any of the embodiments 1-2, further comprising:
deciding 505 that a starting point on the carrier for allocating the RBs is for the second RAT, e.g. the second RAT may be LTE if first RAT is NR or NR if first RAT is LTE
evaluating 506 a first allocation strategy with the decided second RAT starting point by: allocating a second number of RBs to the second RAT, wherein the second number of RBs is based on a number of RBs requested for the second RAT, then allocating the rest of the RBs to the first RAT, up to a first number of RBs that meets the requested number for the first RAT, and computing a first difference between the number of RBs requested for the second RAT and the second number of RBs allocated to the second RAT, and computing a second difference between the number of RBs requested for the first RAT and the first number of RBs,
then evaluating 507 a second allocation strategy by, allocating a first number of RBs to the first RAT, wherein the first number of RBs is based on a number of RBs requested for the first RAT, then allocating the rest of the RBs to the second RAT, up to a second number of RBs that meets the requested number for the second RAT, and computing a first difference between the number of RBs requested for the first RAT and the first number of RBs allocated to the first RAT, and computing a second difference between the number of RBs requested for the second RAT and the second number of RBs.
with the second RAT as starting point selecting 508 an allocation strategy out of the first allocation strategy and second allocation strategy based on the first difference and the second difference of the evaluated first strategy, and the first difference and second difference of the evaluated second strategy.

4. The method according to embodiment 3, wherein:
evaluating 506 a first allocation strategy comprises:
allocating the second number of RBs to the second RAT, by allocating contiguous RBs starting from a first edge of the frequency carrier, and allocating the rest of the RBs to the first RAT by allocating contiguous RBs starting from the other edge of the frequency carrier, and wherein,
evaluating 507 a second allocation strategy comprises:
allocating the first number of RBs to the first RAT, by allocating contiguous RBs starting from the first edge of the frequency carrier, and allocating the rest of the RBs to the second RAT by allocating contiguous RBs starting from the other edge of the frequency carrier.

5. The method according to any of the embodiments 3-4, wherein with the any one or more out of the first RAT or second RAT as starting point, any of the selecting 504 and 508 an allocation strategy out of the first allocation strategy and second allocation strategy comprises selecting the allocation strategy with the minimum difference out of the first difference and the second difference of the evaluated first strategy, and the first difference and second difference of the evaluated second strategy.

6. The method according to any of the embodiments 3-5, further comprising:
applying 509 any one out of: the selected allocation strategy with the first RAT as starting point, and—the selected allocation strategy with the second RAT as starting point, based on
the first RAT as starting point first difference and the second difference of the evaluated first strategy, and the first difference and second difference of the evaluated second strategy, and
the second RAT as starting point first difference and the second difference of the evaluated first strategy, and the first difference and second difference of the evaluated second strategy.

7. The method according to embodiment 6, wherein applying 509 any one out of: the selected allocation strategy with the first RAT as starting point, and the selected allocation strategy with the second RAT as starting point:
comprises applying the allocation strategy with the minimum difference out of the first difference and the second difference of the evaluated first strategy, and the first difference and second difference of the evaluated second strategy 8. The method according to any of the embodiments 3-7, wherein RBs allocated to respectively the first RAT and second RAT are in contiguous groups on the bandwidth of the carrier.

9. The method according to any of the embodiments 3-8, wherein the size of the RBs are the same irrespective of being used by the first RAT or by the second RAT, while the number of RBs on the frequency carrier available for use differs between the first and second RAT, and in any of the actions of evaluating 502, 503, 506, 507 of the first and second allocation strategies, a RB allocated at the edge of the frequency carrier for the first RAT is at another distance from the centre of the frequency carrier that edge most RB allocated to the second RAT.

10. The method according to any of the embodiments 1-9, wherein RBs are allocated in quantification numbers of Resource Blocks Groups, RBGs, each comprising two or more RBS, and accordance with the resource allocation type 0, and wherein the RBG size may be different for the first RAT and the second RAT.

11. The method according any of the embodiments 4-10, wherein RBGs allocated to the first RAT and RBGs allocated to the second RAT are distributed from opposite edges of the frequency carrier bandwidth, leaving any potentially unused RB inbetween the groups of RBs allocated to the respective of the first RAT and second RAT.

12. The method according to any of the embodiments 4-11, wherein any one out of deciding 501 that the starting point on the carrier for allocating the RBs is for the first RAT, and deciding 505 that a starting point on the carrier for allocating the RBs is for the second RAT, are based on an RB offset between the total RBs in the first RAT and the total RBs in the second RAT.

13. A computer program comprising instructions, which when executed by a processor, causes the processor to perform actions according to any of the embodiments 1-12.

14. A carrier comprising the computer program of embodiment 13, wherein the carrier is one of an electronic signal, an optical signal, an electromagnetic signal, a magnetic signal, an electric signal, a radio signal, a microwave signal, or a computer-readable storage medium.

15. A network node 110 configured to apply an allocation strategy to allocate Resource Block, RBs, to be a shared on a frequency carrier to respectively a first Radio Access technology, RAT, and to a second RAT for radio communication with a User Equipment, UE, 120, which first RAT and second RAT are adapted to share a bandwidth of the frequency carrier wherein a resource allocation type 0 is adapted to be used to allocate the RBs to both the first RAT and to the second RAT, the network node 110 further being configured to:

decide, e.g. by means of the deciding unit, that a starting point on the carrier for allocating the RBs is for the first RAT, evaluate e.g. by means of the evaluating unit, a first allocation strategy with the decided first RAT starting point by: allocating a first number of RBs to the first RAT, wherein the first number of RBs is based on number of RBs requested for the first RAT, then allocating the rest of the RBs to the second RAT, up to a second number of RBs that meets the requested number for the second RAT, and computing a first difference between the number of RBs requested for the first RAT and the first number of RBs allocated to the first RAT, and computing a second difference between the number of RBs requested for the second RAT and the second number of RBs, then evaluate, e.g. by means of the evaluating unit, a second allocation strategy, being adapted to: allocate a second number of RBs to the second RAT, wherein the second number of RBs is based on number of RBs requested for the second RAT, then allocate the rest of the RBs to the first RAT, up to a first number of RBs that meets the requested number for the first RAT, and compute a first difference between the number of RBs requested for the second RAT and the second number of RBs allocated to the second RAT, and compute a second difference between the number of RBs requested for the first RAT and the first number of RBs, with the first RAT as starting point, select, e.g. by means of the selecting unit, an allocation strategy out of the first allocation strategy and second allocation strategy based on the first difference and the second difference of the evaluated first strategy, and the first difference and second difference of the evaluated second strategy.

16. The network node 110 according to embodiment 15, wherein:

to evaluate the first allocation strategy is adapted to comprise: allocate the first number of RBs to the first RAT, by allocating contiguous RBs starting from a first edge of the frequency carrier, and allocating the rest of the RBs to the second RAT by allocating contiguous RBs starting from the other edge of the frequency carrier, and wherein, and to evaluate a second allocation strategy is adapted to comprise: to allocate the second number of RBs to the second RAT, by allocating contiguous RBs starting from the first edge of the frequency carrier, and allocating the rest of the RBs to the first RAT by allocating contiguous RBs starting from the other edge of the frequency carrier.

17. The network node 110 according to any of the embodiments 15-16, further being configured to:

decide that a starting point on the carrier for allocating the RBs is for the second RAT, evaluate, e.g. by means of the evaluating unit, a first allocation strategy with the decided second RAT starting point by: allocating a second number of RBs to the second RAT, wherein the second number of RBs is based on number of RBs requested for the second RAT, then allocating the rest of the RBs to the first RAT, up to a first number of RBs that meets the requested number for the first RAT, and computing a first difference between the number of RBs requested for the second RAT and the second number of RBs allocated to the second RAT, and computing a second difference between the number of RBs requested for the first RAT and the first number of RBs, then evaluate, e.g. by means of the evaluating unit, a second allocation strategy by, allocating a first number of RBs to the first RAT, wherein the first number of RBs is based on number of RBs requested for the first RAT, then allocating the rest of the RBs to the second RAT, up to a second number of RBs that meets the requested number for the second RAT, and computing a first difference between the number of RBs requested for the first RAT and the first number of RBs allocated to the first RAT, and computing a second difference between the number of RBs requested for the second RAT and the second number of RBs, and with the second RAT as starting point, select, e.g. by means of the selecting unit, an allocation strategy out of the first allocation strategy and second allocation strategy based on the first difference and the second difference of the evaluated first strategy, and the first difference and second difference of the evaluated second strategy.

18. The network node 110 according to embodiment 17, wherein:

to evaluate a first allocation strategy being adapted to comprise: to allocate the second number of RBs to the second RAT, by allocating contiguous RBs starting from a first edge of the frequency carrier, and allocating the rest of the RBs to the first RAT by allocating contiguous RBs starting from the other edge of the frequency carrier, and wherein, to evaluate a second allocation strategy is adapted to comprise: to allocate the first number of RBs to the first RAT, by allocating contiguous RBs starting from the first edge of the frequency carrier, and allocating the rest of the RBs to the second RAT by allocating contiguous RBs starting from the other edge of the frequency carrier.

19. The network node 110 according to any of the embodiments 17-18, further being configured to, with the any one or more out of the first RAT or second RAT as starting point, select, e.g. by means of the selecting unit, an allocation strategy out of the first allocation strategy and second allocation strategy by selecting the allocation strategy with the minimum difference out of the first difference and the second difference of the evaluated first strategy, and the first difference and second difference of the evaluated second strategy.

20. The network node 110 according to any of the embodiments 17-19, further being configured to:

apply, e.g. by means of the applying unit, any one out of: the selected allocation strategy with the first RAT as starting point, and—the selected allocation strategy with the second RAT as starting point, based on the first RAT as starting point first difference and the second difference of the evaluated first strategy, and the first difference and second difference of the evaluated second strategy, and the second RAT as starting point first difference and the second difference of the evaluated first strategy, and the first difference and second difference of the evaluated second strategy.

21. The network node 110 according to embodiment 20, being further configured to apply, e.g. by means of the applying unit, any one out of: the selected allocation strategy with the first RAT as starting point, and the selected allocation strategy with the second RAT as starting point, by applying the allocation strategy with the minimum difference out of the first difference and the second difference of the evaluated first strategy, and the first difference and second difference of the evaluated second strategy 22. The network node 110 according to any of the embodiments 17-21, further being configured to allocate RBs to respectively the first RAT and second RAT in contiguous groups on the bandwidth of the carrier.

23. The network node 110 according to any of the embodiments 17-22, wherein the size of the RBs is adapted to be the same irrespective of being used by the first RAT or by the second RAT, while the number of RBs on the frequency carrier available for use are adapted to differ between the first and second RAT, and in any of the evaluate to be performed evaluate the first and second allocation strategies, an RB allocated at the edge of the frequency carrier for the first RAT is at another distance from the centre of the frequency carrier that edge most RB allocated to the second RAT.

24. The network node 110 according to any of the embodiments 17-21, being configured to allocate RBs in quantification numbers of Resource Blocks Groups, RBGs, each being adapted to comprise two or more RBs, and accordance with the resource allocation type 0, and wherein the RBG size may be different for the first RAT and the second RAT.

25. The network node 110 according any of the embodiments 18-24, being configured to distribute RBGs allocated to the first RAT and RBGs allocated to the second from opposite edges of the frequency carrier bandwidth, leaving any potentially unused RB in-between the groups of RBs allocated to the respective of the first RAT and second RAT.

26. The method network node 110 to any of the embodiments 18-25, further being configured to act according to any one out of decide that the starting point on the carrier for allocating the RBs is for the first RAT, and decide that a starting point on the carrier for allocating the RBs is for the second RAT, based on an RB offset between the total RBs in the first RAT and the total RBs in the second RAT.

The invention claimed is:

1. A method performed by a network node for selecting an allocation strategy for allocating Resource Block Groups, RBGs, on a frequency carrier to respectively a first Radio Access technology, RAT, and to a second RAT for radio communication with a User Equipment, UE, wherein a resource allocation type 0 is used for allocation of RBGs to both the first RAT and to the second RAT, wherein each RBG comprises one or more RBs, the method comprising:

deciding that a starting point on the carrier for allocating the RBGs when evaluating a first allocation strategy is for the first RAT, to be followed by the second RAT when evaluating a second allocation strategy, evaluating a first allocation strategy by allocating with start from the decided first RAT starting point, a first number of RBGs to the first RAT, wherein the first number of RBGs is based on a number of RBs requested for the first RAT, then allocating to the second RAT a second number of RBGs by use of the RBs that remains on the carrier after occupation of the first number of RBGs, whereas the second number should be no more than to meet a number of RBs requested for the second RAT, and computing a first difference between the number of RBs requested for the first RAT and a first number of RBs comprised in the first number of RBGs allocated to the first RAT, and computing a second difference between the number of RBs requested for the second RAT and a second number of RBs as comprised in the second number of RBGs, then evaluating a second allocation strategy, by allocating to the decided second RAT, with start from the edge of the frequency carrier opposing that the starting point, a second number of RBGs to the second RAT, wherein the second number of RBGs is based on a number of RBs requested for the second RAT, then allocating to the first RAT, a first number of RBGs by use of the RBs that remains on the frequency carrier after occupation by the second number of RBGs, whereas the first number of RBGs should be no more than to meet a requested number of RBs for the first RAT, and computing a first difference between the number of RBs requested for the second RAT and the second number of RBs as comprised in the second number of RBGs, and computing a second difference between the number of RBs requested for the first RAT and a first number of RBs as comprised in the first number of RBGs, and with the starting point being for the first RAT, selecting an allocation strategy out of the first allocation strategy and second allocation strategy based on the first difference and the second difference of the evaluated first strategy, and the first difference and second difference of the evaluated second strategy.

2. The method according to claim 1, wherein the resource allocation type 0 indicates an allocated RBG with respect to a grid of RBs having a start point RB, and where there is a difference between the first and second RAT in respect of at least one of:

a distance from the center of the frequency carrier to the start point RB;

the number of RBs comprised in the RBG; and the number of RB/s comprised in at least one of the RBG that is located at an edge of the frequency carrier.

3. The method according to claim 1, wherein:

evaluating a first allocation strategy comprises: allocating the first number of RBGs to the first RAT, by allocating contiguous RBGs starting from a first edge of the frequency carrier, and allocating the second number of RBGs to the second RAT by allocating contiguous RBGs starting from the other edge of the frequency carrier, and wherein, evaluating a second allocation strategy comprises: allocating the second number of RBGs to the second RAT, by allocating contiguous RBGs starting from the first edge of the frequency carrier, and allocating the first number of the RBGs to the first RAT by allocating contiguous RBGs starting from the other edge of the frequency carrier.

4. The method according to claim 1, further comprising:
deciding that a starting point on the carrier for allocating the RBs when evaluating a third allocation strategy is for the second RAT, to be followed by the first RAT when evaluating a fourth allocation strategy,
evaluating the third allocation strategy by allocating with start from the decided second RAT starting point, a second number of RBGs to the second RAT, wherein the second number of RBGs is based on a number of RBs requested for the second RAT, then allocating to the first RAT a first number of RBGs by use of the RBs that remains on the carrier after occupation of the second number of RBGs, whereas the first number should be no more than to meet a number of RBs requested for the first RAT, and computing a first difference between the number of RBs requested for the second RAT and a second number of RBs comprised in the second number of RBGs allocated to the second RAT, and computing a second difference between the number of RBs requested for the first RAT and a first number of RBs as comprised in the first number of RBGs,
then evaluating a fourth allocation strategy, by allocating to the decided first RAT, with start from the edge of the frequency carrier opposing that the starting point, a first number of RBGs to the first RAT, wherein the first number of RBGs is based on a number of RBs requested for the first RAT, then allocating to the second RAT, a second number of RBGs by use of the RBs that remains on the frequency carrier after occupation by the first number of RBGs, whereas the second number of RBGs should be no more than to meet a requested number of RBs for the second RAT, and computing a first difference between the number of RBs requested for the first RAT and the first number of RBs as comprised in the first number of RBGs, and computing a second difference between the number of RBs requested for the second RAT and a second number of RBs as comprised in the second number of RBGs, and
with the starting point being for the second RAT, selecting an allocation strategy out of the third allocation strategy and fourth allocation strategy based on the first difference and the second difference of the evaluated third strategy, and the first difference and second difference of the evaluated fourth strategy.

5. The method according to claim 4, wherein:
evaluating the third allocation strategy comprises: allocating the second number of RBGs to the second RAT, by allocating contiguous RBGs starting from a first edge of the frequency carrier, and allocating the first RBGs to the first RAT by allocating contiguous RBGs starting from the other edge of the frequency carrier, and wherein,
evaluating the fourth allocation strategy comprises: allocating the first number of RBGs to the first RAT, by allocating contiguous RBGs starting from the first edge of the frequency carrier, and allocating the second number RBGs to the second RAT by allocating contiguous RBGs starting from the other edge of the frequency carrier.

6. The method according to claim 4, wherein with the any one or more out of the first RAT or second RAT as starting point, any of the selecting an allocation strategy out of the first allocation strategy and second allocation strategy, or third allocation strategy and fourth allocation strategy, comprises selecting the allocation strategy with the minimum difference out of the first difference and the second difference of the evaluated first allocation strategy and second allocation strategy, or third allocation strategy and fourth allocation strategy.

7. The method according to claim 3, further comprising:
applying any one out of: the selected allocation strategy with the first RAT as starting point, and the selected allocation strategy with the second RAT as starting point, based on
the first RAT as starting point first difference and the second difference of the evaluated first strategy, and the first difference and second difference of the evaluated second strategy, and
the second RAT as starting point first difference and the second difference of the evaluated third strategy, and the first difference and second difference of the evaluated fourth strategy.

8. The method according to claim 7, wherein applying any one out of: the selected allocation strategy with the first RAT as starting point, and the selected allocation strategy with the second RAT as starting point, comprises applying the allocation strategy with the minimum difference out of the first difference and the second difference of the evaluated first strategy, and the first difference and second difference of the evaluated second strategy.

9. The method according to claim 4, wherein RBGs allocated to respectively the first RAT and second RAT are in contiguous groups on the bandwidth of the carrier.

10. The method according to claim 4, wherein any one out of deciding that the starting point on the carrier for allocating the RBGs is for the first RAT, and deciding that a starting point on the carrier for allocating the RBGs is for the second RAT, are based on an RB offset between the first RBGs in the first RAT and the second number of RBGs in the second RAT.

11. A computer program for selecting an allocation strategy for allocating Resource Block Groups, RBGs, on a frequency carrier to respectively a first Radio Access technology, RAT, and to a second RAT for radio communication with a User Equipment, UE, wherein a resource allocation type 0 is used for allocation of RBGs to both the first RAT and to the second RAT, wherein each RBG comprises one or more RBs, the computer program comprising instructions, which when executed by a processor, causes the processor to:
decide that a starting point on the carrier for allocating the RBGs when evaluating a first allocation strategy is for the first RAT, to be followed by the second RAT when evaluating a second allocation strategy,
evaluate a first allocation strategy by allocating with start from the decided first RAT starting point, a first number of RBGs to the first RAT, wherein the first number of RBGs is based on a number of RBs requested for the first RAT, then allocating to the second RAT a second number of RBGs by use of the RBs that remains on the carrier after occupation of the first number of RBGs, whereas the second number should be no more than to meet a number of RBs requested for the second RAT, and computing a first difference between the number of RBs requested for the first RAT and a first number of RBs comprised in the first number of RBGs allocated to the first RAT, and computing a second difference between the number of RBs requested for the second RAT and a second number of RBs as comprised in the second number of RBGs, evaluate a second allocation strategy, by allocating to the decided second RAT, with start from the edge of the frequency carrier opposing that the starting point, a second number of RBGs to the second RAT, wherein the second number of RBGs is based on a number of RBs requested for the second RAT, then allocating to the first RAT, a first number of RBGs by use of the RBs that remains on the frequency carrier after occupation by the second number of RBGs, whereas the first number of RBGs should be no more than to meet a requested number of RBs for the first RAT, and computing a first difference between the number of RBs requested for the second RAT and the second number of RBs as comprised in the second number of RBGs, and computing a second difference between the number of RBs requested for the first RAT and a first number of RBs as comprised in the first number of RBGs, and with the starting point being for the first RAT, select an allocation strategy out of the first allocation strategy and second allocation strategy based on the first difference and the second difference of the evaluated first strategy, and the first difference and second difference of the evaluated second strategy.

12. A network node configured to select an allocation strategy for allocating Resource Block Groups, RBGs, on a frequency carrier to respectively a first Radio Access technology, RAT, and a second RAT for radio communication with a User Equipment, UE, wherein a resource allocation type 0 is adapted to be used for allocation of RBGs to both the first RAT and to the second RAT, wherein each RBG is adapted to comprise one or more RBs, wherein the network node further is configured to:

decide that a starting point on the carrier for allocating the RBGs when evaluating a first allocation strategy is for the first RAT, to be followed by the second RAT when evaluating a second allocation strategy, evaluate a first allocation strategy by allocate with start from the decided first RAT starting point, a first number of RBGs to the first RAT, wherein the first number of RBGs is adapted to be based on a number of RBs requested for the first RAT, then allocate to the second RAT a second number of RBGs by use of the RBs that remains on the carrier after occupation of the first number of RBGs, whereas the second number should be no more than to meet a number of RBs requested for the second RAT, and compute a first difference between the number of RBs requested for the first RAT and a first number of RBs comprised in the first number of RBGs allocated to the first RAT, and compute a second difference between the number of RBs requested for the second RAT and a second number of RBs as comprised in the second number of RBGs, then evaluate a second allocation strategy, by allocate to the decided second RAT, with start from the edge of the frequency carrier opposing that the starting point, a second number of RBGs to the second RAT, wherein the second number of RBGs is adapted to be based on a number of RBs requested for the second RAT, then allocate to the first RAT, a first number of RBGs by use of the RBs that remains on the frequency carrier after occupation by the second number of RBGs, whereas the first number of RBGs should be no more than to meet a requested number of RBs for the first RAT, and compute a first difference between the number of RBs requested for the second RAT and the second number of RBs as comprised in the second number of RBGs, and compute a second difference between the number of RBs requested for the first RAT and a first number of RBs as comprised in the first number of RBGs, and with the starting point being for the first RAT, select an allocation strategy out of the first allocation strategy and second allocation strategy based on the first difference and the second difference of the evaluated first strategy, and the first difference and second difference of the evaluated second strategy.

13. The network node according to claim 12, wherein the resource allocation type 0 is adapted to indicate an allocated RBG with respect to a grid of RBs having a start point RB, and where there is adapted to be a difference between the first and second RAT in respect of at least one of:
   a distance from the center of the frequency carrier to the start point RB;
   the number of RBs comprised in the RBG; and
   the number of RBs comprised in at least one of the RBG that is located at an edge of the frequency carrier.

14. The network node according to claim 12, further being configured to:
   evaluate a first allocation strategy comprising: allocate the first number of RBGs to the first RAT, by allocating contiguous RBGs starting from a first edge of the frequency carrier, and allocate the second number of RBGs to the second RAT by allocating contiguous RBGs starting from the other edge of the frequency carrier, and,
   evaluate a second allocation strategy comprising: allocate the second number of RBGs to the second RAT, by allocating contiguous RBGs starting from the first edge of the frequency carrier, and allocate the first number of the RBGs to the first RAT by allocating contiguous RBGs starting from the other edge of the frequency carrier.

15. The network node according to claim 12, further being configured to:
   decide that a starting point on the carrier for allocating the RBs when evaluating a third allocation strategy is for the second RAT, to be followed by the first RAT when evaluating a fourth allocation strategy,
   evaluate the third allocation strategy by allocating with start from the decided second RAT starting point, a second number of RBGs to the second RAT, wherein the second number of RBGs is adapted to be based on a number of RBs requested for the second RAT, then allocate to the first RAT a first number of RBGs by use of the RBs that remains on the carrier after occupation of the second number of RBGs, whereas the first number should be no more than to meet a number of RBs requested for the first RAT, and compute a first difference between the number of RBs requested for the second RAT and a second number of RBs comprised in the second number of RBGs allocated to the second RAT, and compute a second difference between the number of RBs requested for the first RAT and a first number of RBs as comprised in the first number of RBGs,
   then evaluate a fourth allocation strategy, by allocate to the decided first RAT, with start from the edge of the frequency carrier opposing that the starting point, a first number of RBGs to the first RAT, wherein the first number of RBGs is adapted to be based on a number of RBs requested for the first RAT, then allocating to the second RAT, a second number of RBGs by use of the RBs that remains on the frequency carrier after occupation by the first number of RBGs, whereas the second number of RBGs should be no more than to meet a requested number of RBs for the second RAT, and compute a first difference between the number of RBs requested for the first RAT and the first number of RBs as comprised in the first number of RBGs, and computing a second difference between the number of RBs requested for the second RAT and a second number of RBs as comprised in the second number of RBGs, with the starting point being for the second RAT, select an allocation strategy out of the third allocation strategy and fourth allocation strategy based on the first difference and the second difference of the evaluated third strategy, and the first difference and second difference of the evaluated fourth strategy.

16. The network node according to claim 15, further being configured to:

evaluate the third allocation strategy comprising: allocate the second number of RBGs to the second RAT, by allocating contiguous RBGs starting from a first edge of the frequency carrier, and allocate the first RBGs to the first RAT by allocating contiguous RBGs starting from the other edge of the frequency carrier, and, evaluate the fourth allocation strategy comprising: allocate the first number of RBGs to the first RAT, by allocating contiguous RBGs starting from the first edge of the frequency carrier, and allocate the second number RBGs to the second RAT by allocating contiguous RBGs starting from the other edge of the frequency carrier.

17. The network node according to claim 15, further being configured to: with the any one or more out of the first RAT or second RAT as starting point, any of the select an allocation strategy out of the first allocation strategy and second allocation strategy, or third allocation strategy and fourth allocation strategy, by selecting the allocation strategy with the minimum difference out of the first difference and the second difference of the evaluated first allocation strategy and second allocation strategy, or third allocation strategy and fourth allocation strategy.

18. The network node according to claim 15, further being configured to:

apply any one out of: the selected allocation strategy with the first RAT as starting point, and the selected allocation strategy with the second RAT as starting point, based on the first RAT as starting point first difference and the second difference of the evaluated first strategy, and the first difference and second difference of the evaluated second strategy, and the second RAT as starting point first difference and the second difference of the evaluated third strategy, and the first difference and second difference of the evaluated fourth strategy.

19. The network node according to claim 18, further being configured to apply any one out of: the selected allocation strategy with the first RAT as starting point, and the selected allocation strategy with the second RAT as starting point, by applying the allocation strategy with the minimum difference out of the first difference and the second difference of the evaluated first strategy, and the first difference and second difference of the evaluated second strategy.

* * * * *